United States Patent
Adachi et al.

(10) Patent No.: US 6,216,544 B1
(45) Date of Patent: *Apr. 17, 2001

(54) ULTRASONIC FLOWMETER HAVING REDUCED PHASE DIFFERENCE

(75) Inventors: Akihisa Adachi, Yamatokoriyama; Yuji Nakabayashi, Nara; Masahiko Hashimoto, Tokyo; Toshiharu Sato, Kawasaki; Shigeru Iwanaga, Nara, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,532

(22) PCT Filed: Apr. 18, 1998

(86) PCT No.: PCT/JP98/01740

§ 371 Date: Dec. 18, 1998

§ 102(e) Date: Dec. 18, 1998

(87) PCT Pub. No.: WO98/48247

PCT Pub. Date: Oct. 29, 1998

(30) Foreign Application Priority Data

Apr. 18, 1997 (JP) .................................................. 9-101423

(51) Int. Cl.[7] ....................................................... G01F 1/66

(52) U.S. Cl. ............................................................ 73/861.25

(58) Field of Search ............................ 73/861.18, 861.25, 73/861.26, 861.27, 861.28, 861.29, 861.31, 861.04

(56) References Cited

U.S. PATENT DOCUMENTS

| | | | |
|---|---|---|---|
| 3,906,791 | * 9/1975 | Lynnworth | 73/861.18 |
| 4,176,337 | * 11/1979 | Aechter et al. | 73/861.26 |
| 4,475,406 | * 10/1984 | Ansaldi et al. | 73/861.29 |
| 4,596,133 | * 6/1986 | Smalling et al. | 73/861.18 |
| 5,383,369 | * 1/1995 | Khuri-Yakub et al. | 73/861.29 |
| 5,652,396 | * 7/1997 | Gill | 73/861.27 |
| 5,777,237 | * 7/1998 | Collier et al. | 73/861.28 |

FOREIGN PATENT DOCUMENTS

| | | |
|---|---|---|
| 3113324 | 5/1991 | (JP) . |
| 3-104817 | 10/1991 | (JP) . |
| 5072011 | 3/1993 | (JP) . |
| 8-507373 | 8/1996 | (JP) . |
| 8233628 | 9/1996 | (JP) . |
| 8313316 | 11/1996 | (JP) . |
| WO 94/20821 | 9/1994 | (WO) . |

* cited by examiner

Primary Examiner—Max Noori
Assistant Examiner—Jagdish Patel
(74) Attorney, Agent, or Firm—Snell & Wilmer, LLP; Michael K. Kelly

(57) ABSTRACT

An ultrasonic flowmeter includes a flow path defined by four wall sections, a flow measurement section, a calculation section and a pair of ultrasonic oscillators for transmitting and receiving an ultrasonic wave over a distance. The flow path is configured to reduce the influence of a phase difference, which results from the varying propagation distances of a direct wave and a reflected wave, by changing one or more of the flow measurement section configuration, the ultrasonic wave frequency, the orientation of the ultrasonic oscillators, and the distance between the pair of ultrasonic oscillators. A measurement section is suitably configured to measure the propagation time of the ultrasonic wave propagating between the pair of ultrasonic oscillators. Additionally, a calculation section is suitably configured to receive measurements from the measurement section and to calculate the fluid flow in the flow measurement section.

19 Claims, 18 Drawing Sheets

Propagation time

Propagation phase difference: 0.7π

Propagation time

Propagation phase difference: 2.2π

ULTRASONIC FLOWMETER HAVING REDUCED PHASE DIFFERENCE

TECHNICAL FIELD

The present invention relates to an ultrasonic flowmeter for measuring the flow of a fluid by use of an ultrasonic wave.

BACKGROUND ART

One of conventional ultrasonic flowmeters of the type described above is disclosed, for example, in Japanese Laid-Open Publication No. 8-233628. In this ultrasonic flowmeter, as shown in FIGS. 27A and 27B, ultrasonic oscillators 2 and 3 are disposed facing each other in a portion of a flow path 1 which is a rectangle in section 4. The speed of a fluid is calculated by a flow calculation means 5 using the difference between the propagation time in which an ultrasonic wave transmitted from the ultrasonic oscillator 2 is received by the ultrasonic oscillator 3 and the propagation time in which an ultrasonic wave transmitted from the ultrasonic oscillator 3 is received by the ultrasonic oscillator 2. At the same time, the flow rate distribution in the flow path 1 is presumed from the Reynolds number of the fluid, to obtain a correction coefficient and thus calculate the flow.

The conventional ultrasonic flowmeter, however, has the following problem. The propagation distance of a reflected wave which is reflected from the inside walls of the flow path is different from the propagation distance of a direct wave which propagates without being reflected. A phase difference is therefore generated between the reflected wave and the direct wave. Since a synthetic wave of the reflected wave and the direct wave is observed as a received wave, the amplitude of the received wave increases or decreases, and the period thereof varies, depending on the phase difference between the reflected wave and the direct wave. This narrows the measurement precision as well as the measurable flow range.

DISCLOSURE OF THE INVENTION

In order to solve the above problem, the present invention includes a flow measurement section and a pair of ultrasonic oscillators constructed so that the influence of the phase difference between the direct wave and the reflected wave on the measurement results is reduced.

According to the above present invention, since the influence of the reflected wave in the measurement section of the flow path can be reduced, the measurement precision can be improved over a wide range.

The ultrasonic flowmeter of the first embodiment according to the present invention includes: a pair of ultrasonic oscillators; a measurement section for measuring a time in which an ultrasonic wave propagates between the pair of ultrasonic oscillators; and a calculation section for calculating the flow of the fluid flowing in a flow measurement section based on an output from the measurement section, wherein the flow measurement section and the pair of ultrasonic oscillators are configured so that an influence of a reflected wave reflected from a wall of the flow measurement section on a measurement result is reduced. Accordingly, the influence of the reflected wave in the flow measurement section can be reduced, to obtain a high-precision ultrasonic flowmeter.

The ultrasonic flowmeter of the second embodiment according to the present invention, for measuring a flow of a fluid by use of an ultrasonic wave, includes: a pair of ultrasonic oscillators; a measurement section for measuring a time in which an ultrasonic wave propagates between the pair of ultrasonic oscillators; and a calculation section for calculating the flow of the fluid flowing in a flow measurement section based on an output from the measurement section, wherein, in a configuration where a phase difference between a direct wave which propagates in the fluid flowing in the flow measurement section without being reflected from a wall of the flow measurement section and a reflected wave which is reflected from a wall of the flow measurement section influences a measurement result, the flow measurement section and the pair of ultrasonic oscillators are configured so that an influence of the phase difference between the direct wave and the reflected wave on the measurement result can be reduced. Accordingly, the influence of the reflected wave in the flow measurement section can be reduced, to obtain a high-precision ultrasonic flowmeter.

The ultrasonic flowmeter of the third embodiment according to the present invention, for measuring a flow of a fluid by use of ultrasonic wave, includes: a pair of ultrasonic oscillators; a measurement section for measuring a time in which an ultrasonic wave propagates between the pair of ultrasonic oscillators; and a calculation section for calculating the flow of the fluid flowing in a flow measurement section based on an output from the measurement section, wherein, in a configuration where a phase difference between a direct wave which propagates in the fluid flowing in the flow measurement section without being reflected from a wall of the flow measurement section and a reflected wave which is reflected from a wall of the flow measurement section influences a measurement result, parameters relating to a frequency of the pair of ultrasonic oscillators, a distance between the pair of ultrasonic oscillators, and a cross section shape of the flow measurement section are combined and characterized so that an influence of the phase difference between the direct wave and the reflected wave on the measurement result can be reduced. Accordingly, the influence of the reflected wave in the flow measurement section can be reduced with a simple structure, to obtain a high-precision ultrasonic flowmeter.

In the ultrasonic flowmeter of the fourth embodiment according to the present invention, based on the ultrasonic flowmeter of the third embodiment, the direct wave is a wave which propagates along a straight line connecting centers of the pair of ultrasonic oscillators, the reflected wave is a wave which propagates along two equal sides of an isosceles triangle formed by connecting the centers of the pair of ultrasonic oscillators and a point on a wall of the flow measurement section, and a propagation phase difference caused by a difference between a propagation distance of the direct wave and a propagation distance of the reflected wave is $3\pi/2$ or more. Accordingly, the influence of the reflected wave in the flow measurement section can be reduced with a simple structure, to obtain a high-precision ultrasonic flowmeter.

In the ultrasonic flowmeter of the fifth embodiment according to the present invention, based on the ultrasonic flowmeter of the third embodiment, the direct wave is a wave which propagates along a straight line connecting centers of the pair of ultrasonic oscillators, the reflected wave is a wave which is reflected only once from a wall of the flow measurement section, and one side or a diameter of effective radiation surfaces of the pair of ultrasonic oscillators is shorter than a height of the flow measurement section so that a shortest propagation time of the reflected wave is longer than a propagation time of the direct wave. Accordingly, the influence of the reflected wave in the flow measurement section can be reduced with a simple structure, to obtain a high-precision ultrasonic flowmeter.

In the ultrasonic flowmeter of the sixth embodiment according to the present invention, based on the ultrasonic flowmeter of the fourth or fifth embodiment, a frequency of the pair of ultrasonic oscillators is set at a predetermined value or greater. Accordingly, the influence of the reflected wave in the flow measurement section can be reduced and the time resolution can be improved, to obtain a higher-precision ultrasonic flowmeter.

In the ultrasonic flowmeter of the seventh embodiment according to the present invention, based on the ultrasonic flowmeter of the third embodiment, the direct wave is a wave which propagates along a straight line connecting centers of the pair of ultrasonic oscillators, the reflected wave is a wave which propagates along two equal sides of an isosceles triangle formed by connecting the centers of the pair of ultrasonic oscillators and a point on a wall of the flow measurement section, and a propagation phase difference between a propagation distance of the direct wave and a propagation distance of the reflected wave is $0.2\pi$ or less. Accordingly, the influence of the reflected wave in the flow measurement section can be reduced with a simple structure, to obtain a high-precision ultrasonic flowmeter.

In the ultrasonic flowmeter of the eighth embodiment according to the present invention, based on the ultrasonic flowmeter of the seventh embodiment, the ultrasonic flowmeter further includes at least one or more division plate for dividing the flow measurement -section into a plurality of portions. Accordingly, the influence of the reflected wave in the flow measurement section can be reduced, to obtain a high-precision ultrasonic flowmeter.

In the ultrasonic flowmeter of the ninth embodiment according to the present invention, based on the ultrasonic flowmeter of the eighth embodiment, the frequency of the pair of ultrasonic oscillators is set at a predetermined value or less. Accordingly, the influence of the reflected wave in the flow measurement section can be reduced, to obtain a high-precision ultrasonic flowmeter.

In the ultrasonic flowmeter of the tenth embodiment according to the present invention, based on the ultrasonic flowmeter of any of the first to fifth and seventh embodiments, the sectional shape of the flow measurement section is a rectangle, and a parameter relating to the sectional shape of the flow measurement section is a height of the rectangle. Accordingly, the influence of the reflected wave in the flow measurement section can be reduced with a simple structure, to obtain a high-precision ultrasonic flowmeter.

In the ultrasonic flowmeter of the eleventh embodiment according to the present invention, based on the ultrasonic flowmeter of any of the first to fifth and seventh embodiments, the sectional shape of the flow measurement section is a circle, and a parameter relating to the sectional shape of the flow measurement section is a diameter of the circle. Accordingly, the influence of the reflected wave in the flow measurement section can be reduced with a simple structure, to obtain a high-precision ultrasonic flowmeter.

In the ultrasonic flowmeter of the twelfth embodiment according to the present invention, based on the ultrasonic flowmeter of any of the first to fifth and seventh embodiments, the pair of ultrasonic oscillators are disposed so that a line connecting centers of the pair of ultrasonic oscillators is shifted against a center line of the cross section of the flow measurement section in a predetermined direction. Accordingly, the influence of the reflected wave in the flow measurement section can be reduced, to obtain a high-precision ultrasonic flowmeter.

In the ultrasonic flowmeter of the thirteenth embodiment according to the present invention, based on the ultrasonic flowmeter of the twelfth embodiment, the line connecting the centers of the pair of ultrasonic oscillators and the center line of the cross section of the flow measurement section in a predetermined direction are parallel with each other. Accordingly, the influence of the reflected wave in the flow measurement section can be reduced, to obtain a high-precision ultrasonic flowmeter.

In the ultrasonic flowmeter of the fourteenth embodiment according to the present invention, based on the ultrasonic flowmeter of the twelfth embodiment, the line connecting the centers of the pair of ultrasonic oscillators and the center line of the cross section of the flow measurement section in a predetermined direction cross at a predetermined angle. Accordingly, the influence of the reflected wave in the flow measurement section can be reduced, to obtain a high-precision ultrasonic flowmeter.

In the ultrasonic flowmeter of the fifteenth embodiment according to the present invention, based on the ultrasonic flowmeter of the first or second embodiment, the ultrasonic flowmeter further includes a structure for blocking a generation of a reflected wave which is reflected only once from a wall of the flow measurement section. Accordingly, the influence of the reflected wave in the flow measurement section can be reduced, to obtain a high-precision ultrasonic flowmeter.

In the ultrasonic flowmeter of the sixteenth embodiment according to the present invention, based on the ultrasonic flowmeter of the fifteenth embodiment, the line connecting the centers of the pair of ultrasonic oscillators and the center line of the cross section of the flow measurement section in a predetermined direction cross at a predetermined angle. Accordingly, the influence of the reflected wave in the flow measurement section can be reduced, to obtain a high-precision ultrasonic flowmeter.

In the ultrasonic flowmeter of the seventeenth embodiment according to the present invention, based on the ultrasonic flowmeter of the first or second embodiment, the ultrasonic flowmeter further includes at least one structure disposed in the flow measurement section. Accordingly, the influence of the reflected wave in the flow measurement section can be reduced, to obtain a high-precision ultrasonic flowmeter.

In the ultrasonic flowmeter of the eighteenth embodiment according to the present invention, based on the ultrasonic flowmeter of the seventeenth embodiment, the at least one structure is disposed in the vicinity of the pair of ultrasonic oscillators. Accordingly, the influence of the reflected wave in the flow measurement section can be reduced, to obtain a high-precision ultrasonic flowmeter.

In the ultrasonic flowmeter of the nineteenth embodiment according to the present invention, based on the ultrasonic flowmeter of the seventeenth embodiment, the at least one structure is disposed on a wall of the flow measurement section. Accordingly, the influence of the reflected wave in the flow measurement section can be reduced, to obtain a high-precision ultrasonic flowmeter.

In the ultrasonic flowmeter of the twentieth embodiment according to the present invention, based on the ultrasonic flowmeter of the first or second embodiment, at least one or more concave or convex portion is provided on a wall of the flow measurement section. Accordingly, the influence of the reflected wave in the flow measurement section can be reduced, to obtain a high-precision ultrasonic flowmeter.

In the ultrasonic flowmeter of the twenty-first embodiment according to the present invention, based on the ultrasonic flowmeter of the twentieth embodiment, the ultrasonic flowmeter further includes a mesh structure covering the concave portion. Accordingly, the influence of an reflected wave in the flow measurement section can be reduced, to obtain a high-precision ultrasonic flowmeter.

In the ultrasonic flowmeter of the twenty-second embodiment according to the present invention, based on the ultrasonic flowmeter of the first or second embodiment, the pair of ultrasonic oscillators are disposed so that a line connecting centers of the pair of ultrasonic oscillators and a direction representing a directivity of at least one of the pair of ultrasonic oscillators cross at a predetermined angle. Accordingly, the influence of the reflected wave in the flow measurement section can be reduced, to obtain a high-precision ultrasonic flowmeter.

In the ultrasonic flowmeter of the twenty-third embodiment according to the present invention, based on the ultrasonic flowmeter of any of the first to fifth and seventh embodiments, the ultrasonic flowmeter further includes a rectifying means for rectifying the direction of the flow at least on an upstream side of the flow measurement section. Accordingly, the direction of the flow in the flow measurement section can be made uniform, to obtain further high-precision ultrasonic flowmeter.

BEST MODE FOR CARRYING OUT THE INVENTION

Figure 1:
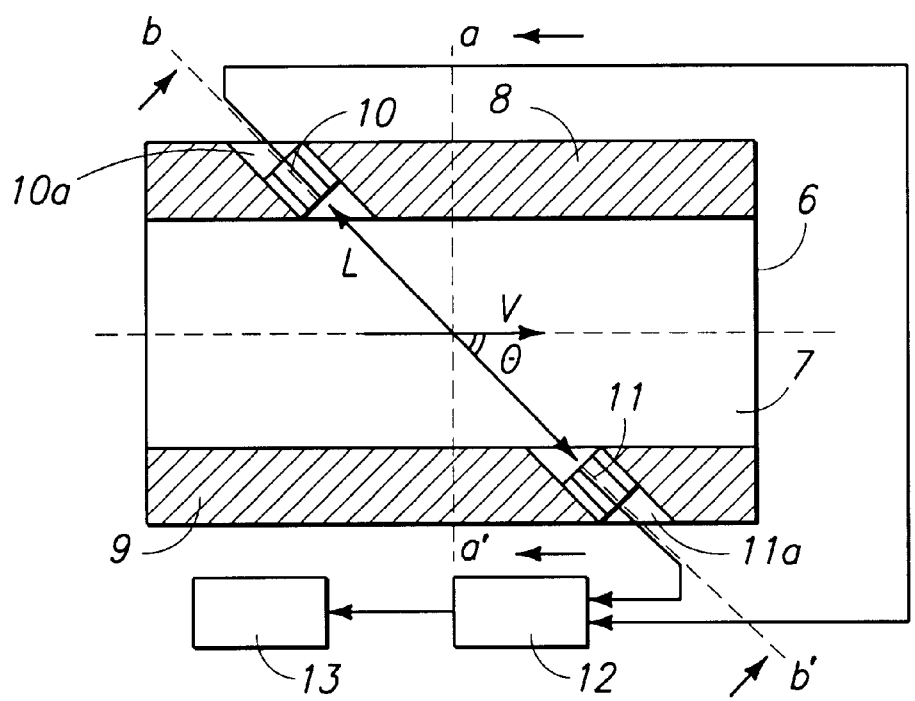
FIG. 1 is a structural view of an ultrasonic flowmeter of Example 1 according to the present invention.

Hereinbelow, the present invention will be described by way of example with reference to the relevant drawings. The same components are denoted by the same reference numerals throughout the figures, and detailed descriptions for the same components are omitted.

EXAMPLE 1

Figure 2:
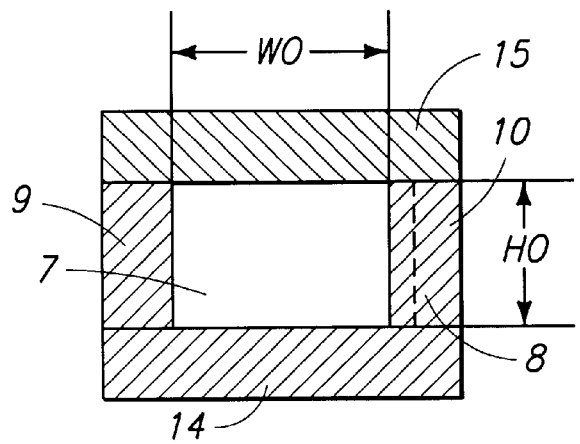
FIG. 2 is a sectional view taken along line a–a' of the above flowmeter, viewed from a side thereof.

FIG. 1 is a structural view of an ultrasonic flowmeter of Example 1 according to the present invention. FIG. 2 is a sectional view taken along line a–a' of a flow path 6 of FIG. 1, viewed from a side thereof. Referring to FIG. 1, the reference numeral 6 denotes the flow path, 7 denotes a flow measurement section, 8 and 9 denote side-wall sections of the flow path 6, and 10 and 11 denote ultrasonic oscillators mounted in the side-wall sections 8 and 9. The reference numeral 12 denotes a measurement section connected to the ultrasonic oscillators 10 and 11, and 13 denotes a calculation section connected to the measurement section 12. Referring to FIG. 2, the reference numeral 14 denotes a lower plate section of the flow path 6, 15 denotes an upper plate section which is attached to the side-wall sections 8 and 9. The sectional shape of the flow measurement section 7 is a rectangle having a width W0 and a height H0.

An example of the method for making the flow path of the ultrasonic flowmeter having the above configuration will be described with reference to FIGS. 1 and 2.

The side-wall sections 8 and 9, the lower plate section 14, and the upper plate section 15 constituting the flow path 6 are made of a material which is free from a chemical change when in contact with an object fluid. In this example, since the air, for example, was used as the object fluid, an ABS resin was selected as the material. The upper plate section 15 is screwed to end surfaces of the side-wall sections 8 and 9 via sealers, to constitute the flow measurement section 7 whose cross section shape is a rectangle. The ultrasonic oscillators 10 and 11 are secured to mounts 10a, 11a provided in the side-wall sections 8, 9 via sealers so that the transmitting and receiving surfaces thereof face each other.

The operation of the ultrasonic flowmeter having the above configuration will be described. The length of a line connecting the centers of the ultrasonic oscillator 10 and the ultrasonic oscillator 11 is denoted by L, and the angle of the above line against the longitudinal direction of the flow measurement section 7 which is the direction of the flow is denoted by θ. Also, the acoustic velocity in the air as the object fluid in a windless state is denoted by C, and the flow rate of the air in the flow measurement section 7 is denoted by V. An ultrasonic wave transmitted from the ultrasonic oscillator 10 disposed on the upstream side of the flow path 6 obliquely crosses the flow measurement section 7 to be received by the ultrasonic oscillator 11 disposed on the downstream side thereof. A propagation time t1 in this case is represented by:

$$t1 = \frac{L}{C + V\cos\theta} \quad \text{(Expression 1)}$$

Thereafter, the transmitting and receiving functions of the ultrasonic oscillators are exchanged with each other, so that the ultrasonic oscillator 11 transmits an ultrasonic wave while the ultrasonic oscillator 10 receives it. A propagation time t2 in this case is represented by:

$$t2 = \frac{L}{C - V\cos\theta} \quad \text{(Expression 2)}$$

When the sound velocity C in the air is deleted from the expressions for the propagation times t1 and t2, the expression:

$$V = \frac{L}{2\cos\theta}\left(\frac{1}{t1} - \frac{1}{t2}\right) \quad \text{(Expression 3)}$$

is obtained. If L and θ are known, the flow rate V is obtained by measuring t1 and t2 by the measurement section 12.

From the resultant flow rate V, a flow Q is obtained by operating:

Q=KSV by the calculation section 13, wherein S denotes the sectional area of the flow measurement section 7 and K denotes a correction coefficient.

The propagation of an ultrasonic wave in the flow measurement section 7 of the ultrasonic flowmeter which measures the flow under the operation principle described above will be described with reference to FIG. 3.

Figure 3:
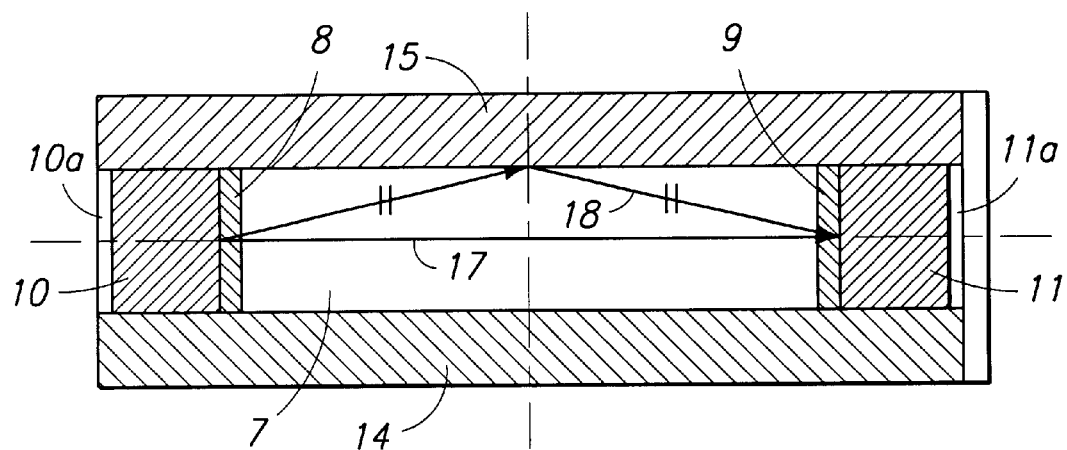
FIG. 3 is a sectional view taken along line b–b' of the above flowmeter, viewed from a side thereof.

FIG. 3 is a sectional view taken along line b–b' of the flow path 6 shown in FIG. 1, viewed from a side thereof.

Since the ultrasonic oscillator 10 has a directivity, a transmitted ultrasonic wave propagates in the flow measurement section 7 while it expands in general. Accordingly, the ultrasonic wave received by the ultrasonic oscillator 11 includes a direct wave propagating along a propagation route 17, for example, in the flow measurement section 7 and a reflected wave propagating along a propagation route 18, for example, where the wave is reflected once from the inner surface of the upper plate section 15 and is received. The propagation routes 17 and 18 represent typical propagation routes. Direct waves which propagate along routes other than the propagation route 17 and reflected waves which propagate along routes other than the propagation route 18 also exist. For example, there also exists a reflected wave which is reflected from the lower plate section 14 and is propagated, or a reflected wave which is received after being reflected, not only once, but twice or more. As a result, a wave received by the ultrasonic oscillator 11 is observed as a synthetic wave of the direct waves and the reflected waves. As is apparent from the propagation routes 17 and 18, the propagation distance of the direct wave is different from that of the reflected wave. The difference between the propagation distance of the propagation route 17 and that of the propagation route 18, ΔL, is represented by:

$$\Delta L = 2\sqrt{\left(\frac{HO}{2}\right)^2 + \left(\frac{L}{2}\right)^2} - L \quad \text{(Expression 4)}$$

When the difference between the propagation distance of the typical propagation routes 17 and 18 is changed to a difference in propagation phase Δθ using a wavelength λ of the ultrasonic oscillators, the expression:

$$\Delta\theta = 2\pi \times \frac{\Delta L}{\lambda} \quad \text{(Expression 5)}$$

is obtained. Thus, a propagation phase difference exists in the ultrasonic wave which propagates in the flow measurement section 7. It is therefore considered that the received wave which is a superimposition of direct waves and reflected waves which propagate along all possible propagation routes is influenced by an interference due to the propagation phase difference.

In order to estimate the influence of reflected waves on direct waves, the propagation route distribution of direct waves and reflected waves, as well as the respective waveforms, were calculated. In this calculation, it was assumed that the shape of the radiation surfaces of the ultrasonic oscillators 10 and 11 is a square (fixed), the distance between the ultrasonic oscillators 10 and 11 is L, and the flow measurement section 7 consists of two parallel plates which spread infinitely. It is also assumed that the object fluid does not flow.

Figure 4A:
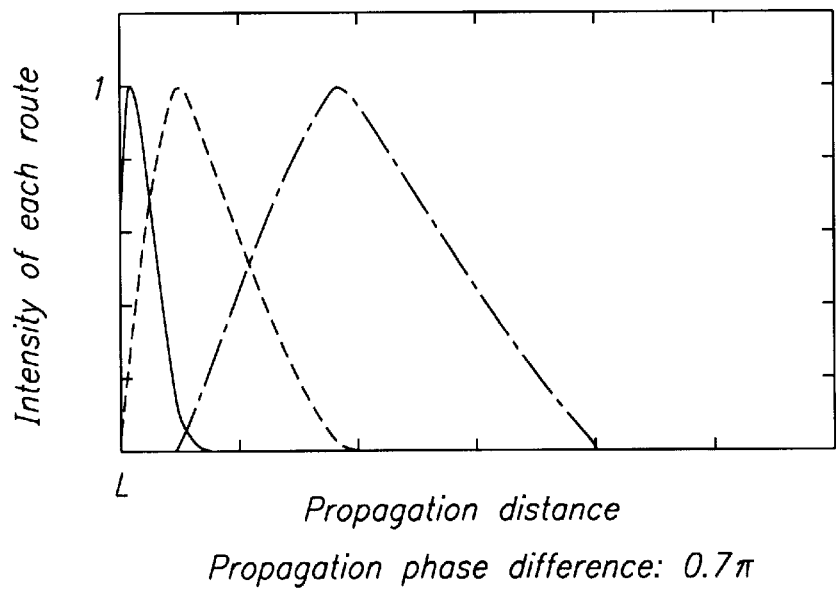
FIGS. 4A and 4B are views illustrating the calculation results of an ultrasonic propagation route distribution in a flow measurement section.
Figure 4B:
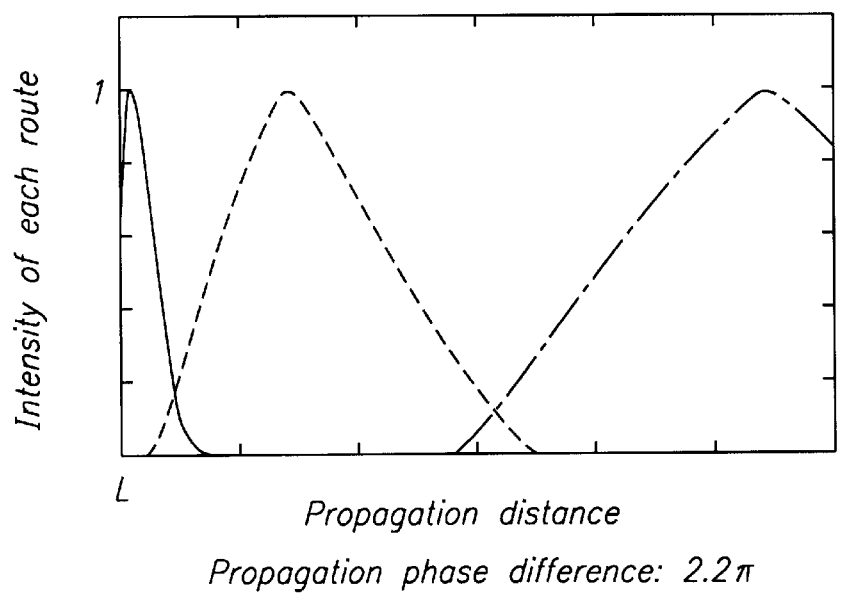

FIGS. 4A and 4B show the calculation results of the propagation route distribution of ultrasonic waves which are transmitted by the ultrasonic oscillator 10 and received by the ultrasonic oscillator 11 obtained when the height (H0) is varied so that the propagation phase difference between the propagation routes 17 and 18 is 0.7π to 2.2π, for example. The solid line represents a direct wave, the dotted line represents a once reflected wave, and the one-dot chain line represents a twice reflected wave. The transverse axis of each of FIGS. 4A and 4B represents the propagation distance for the respective propagation routes, and the longitudinal axis thereof represents the relative intensity of each route.

No change is observable for the propagation route distribution of the direct wave since the shapes of the ultrasonic oscillators 10 and 11 are fixed. The propagation route distribution of the once reflected wave is wider than that of the direct wave. Moreover, as the propagation phase difference is larger, the distribution tends to be wider. The propagation route distribution of the twice reflected wave is further wider than that of the once reflected wave. Moreover, the distance at which the intensity of each route of the direct wave is maximum is substantially equal to the distance of the propagation route 17. And, the distance at which the intensity of each route of the once reflected wave is maximum is substantially equal to the distance of the propagation route 18.

Figure 5A:
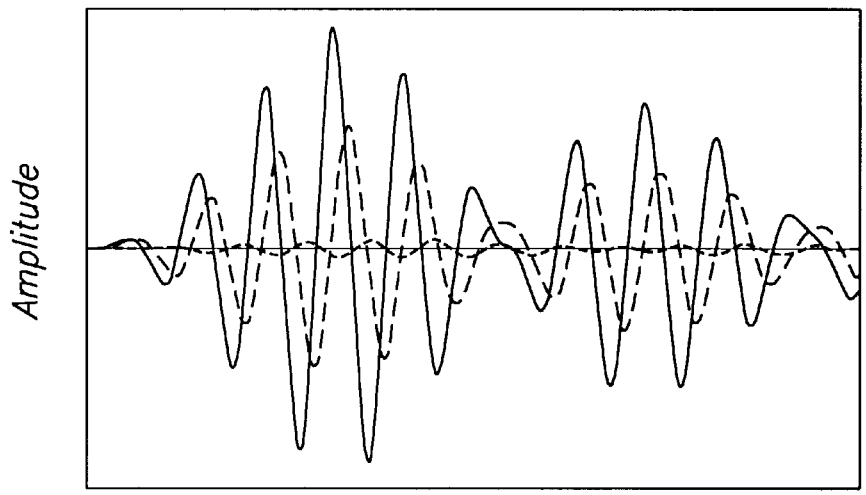
FIGS. 5A and 5B are views illustrating the calculation results of received ultrasonic waves.
Figure 5B:
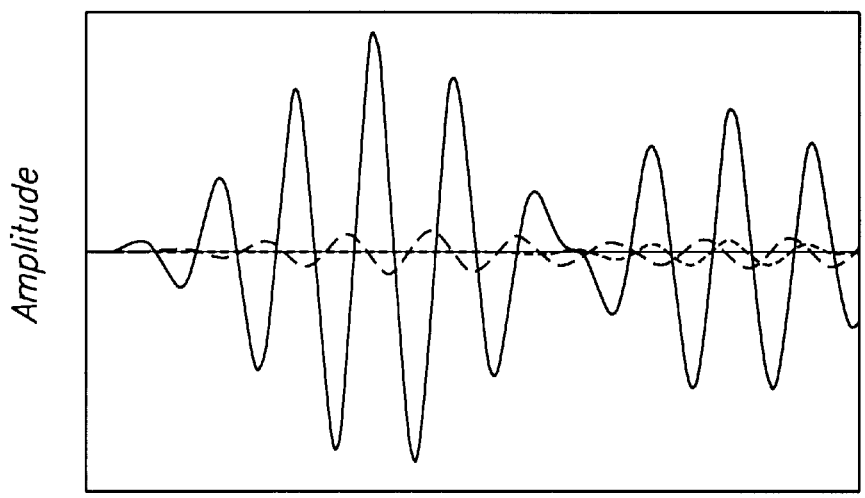

FIGS. 5A and 5B illustrate waveforms of received waves calculated by adding pulse response characteristics of the ultrasonic oscillators 10 and 11 to the calculation results of FIGS. 4A and 4B, respectively. The frequency of the ultrasonic oscillators 10 and 11 is assumed to be 270 kHz. The solid line represents the direct wave, the dotted line represents the once reflected wave, and the one-dot chain line represents the twice reflected wave. The larger the propagation phase difference is, the smaller the amplitude of the once reflected wave is. The twice reflected wave is further smaller than the once reflected wave. This is because, the larger the propagation phase difference between the typical propagation routes 17 and 18 is, the wider the propagation route distribution is and the slower the slope thereof is, as shown in FIGS. 4A and 4B. When all possible propagation routes are considered, the propagation phase differences are found over a wide range and are cancelled due to interference of the reflected waves with one another.

It is also observed from FIGS. 5A and 5B that as the propagation phase difference is larger, the rise of the reflected wave tends to be later than that of the direct wave.

From the calculation results described above, it is found that the influence on the direct wave can be reduced by setting the height (H0) so that the propagation route distribution of the reflected wave becomes wide or by setting the height (H0) so that the propagation phase difference between the propagation routes 17 and 18 becomes large. The influence of the reflected wave on the direct wave can be further reduced by making the height of the radiation surfaces of the ultrasonic oscillators lower than the height (H0).

Figure 6:
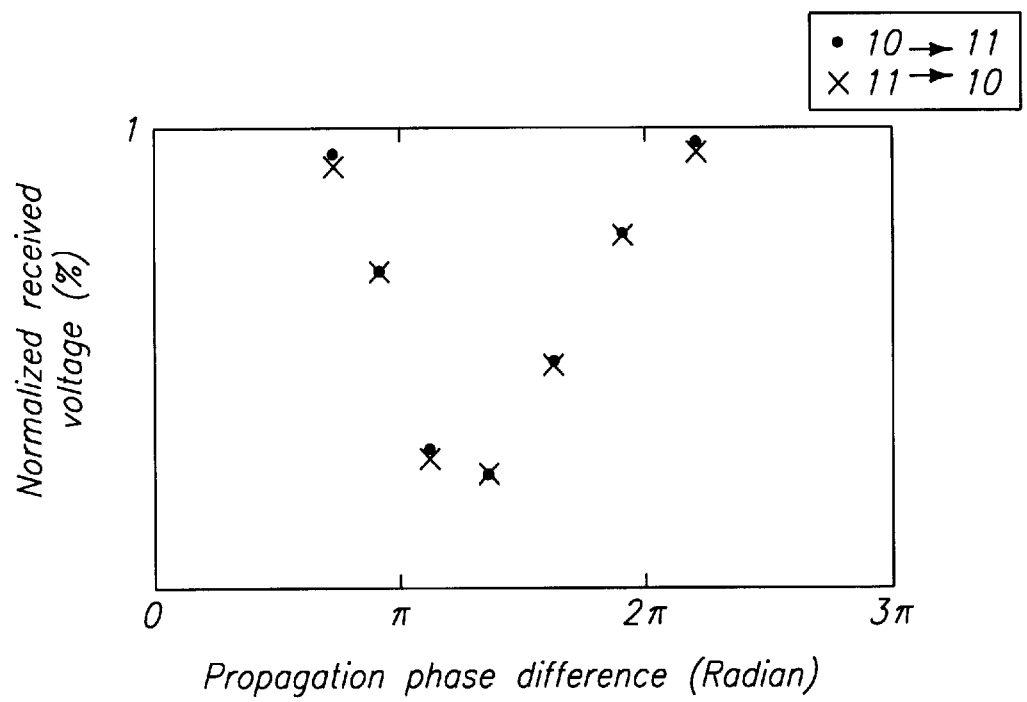
FIG. 6 is a characteristic view illustrating a relative received voltage of the flowmeter.
Figure 7:
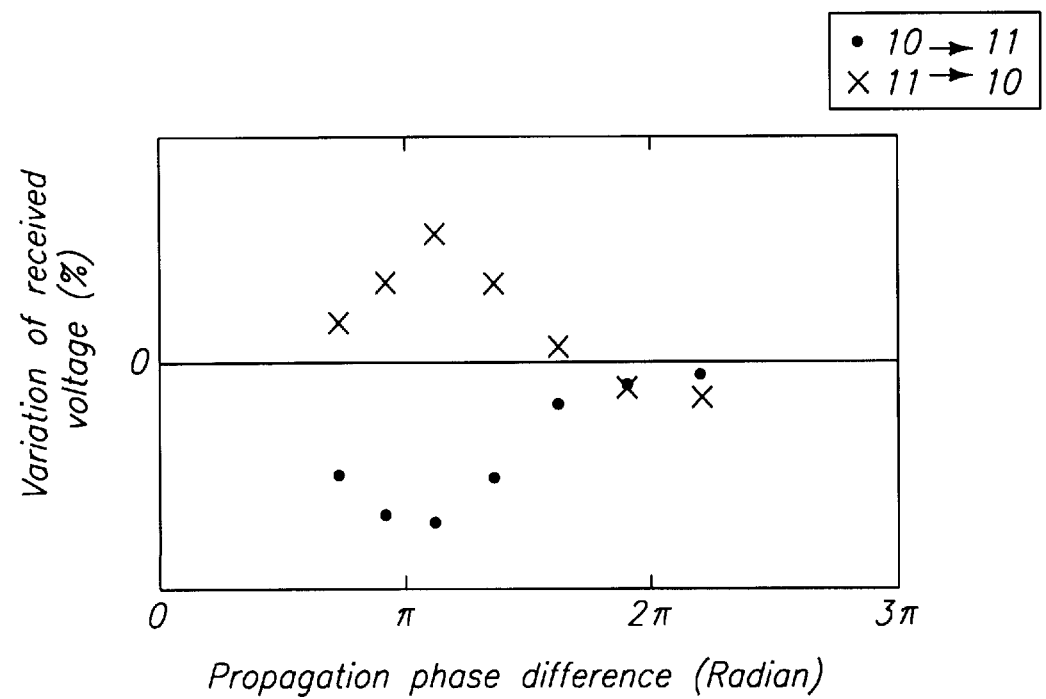
FIG. 7 is a characteristic view illustrating a variation in the received voltage of the flowmeter.

FIGS. 6 and 7 illustrate the results of experiments performed to confirm the influence of the reflected wave on the direct wave. The experiments were performed using the air under the following conditions: the distance between the ultrasonic oscillators 10 and 11 is L; the effective radiation surfaces of the ultrasonic oscillators 10 and 11 are square; the width is W0 (fixed); and the height (H0) is set so that the propagation phase difference between the propagation routes 17 and 18 is $0.7\pi$ to $2.2\pi$. The frequency of the ultrasonic oscillators 10 and 11 is 270 kHz.

The transverse axis of each of FIGS. 6 and 7 represents the propagation phase difference between the propagation route 17 of the direct wave and the propagation route 18 of the reflected wave, calculated using Expression 5. In the calculation, $\lambda$ denotes the wavelength of the ultrasonic oscillators 10 and 11 obtained under the no-flow condition at room temperature. The longitudinal axis of FIG. 6 represents the relative received voltage of the received voltage obtained when the ultrasonic oscillators 10 and 11 are disposed in the flow path 6 with respect to the received voltage when they are disposed in an open space. The measurement was performed under no flow. The longitudinal axis of FIG. 7 represents the variation of the received voltage obtained under a flow of about 6,000 liters/hour with respect to the received voltage obtained under no flow.

As is observed from FIG. 6, the received voltage obtained under no flow tends to be lowest when the propagation phase difference is in the range of about $\pi$ to $1.4\pi$. It is observed from the variation of the received voltage due to the flow shown in FIG. 7 that the received voltage is lowest when the propagation phase difference is in the range of about $0.8\pi$ to $1.2\pi$ for the combination of the ultrasonic oscillator 10 as the transmitter and the ultrasonic oscillator 11 as the receiver. In reverse, the received voltage is highest in the above range for the combination of the ultrasonic oscillator 11 as the transmitter and the ultrasonic oscillator 10 as the receiver. A phenomenon of such an increase in the received voltage will not occur if no phase influence exists in the superimposition between the direct wave and the reflected wave.

The received voltage tends to be reduced when the propagation phase difference is $3\pi/2$ or more, for both the combination of the ultrasonic oscillator 10 as the transmitter and the ultrasonic oscillator 11 as the receiver and the combination of the ultrasonic oscillator 11 as the transmitter and the ultrasonic oscillator 10 as the receiver. This is presumably because the directivity of each of the ultrasonic oscillators 10 and 11 has been deflected due to the flow.

From the above results, it is found that high-precision flow measurement over a wide range is difficult for a height (H0) at which the propagation phase difference between the propagation route 17 of the direct wave and the propagation route 18 of the reflected wave is in the range of about $0.8\pi$ to $1.4\pi$ because the influence of the reflected wave is great at this height. In reverse, high-precision flow measurement over a wide range and a reduction of the influence of the reflected wave is possible if the frequency of the ultrasonic oscillators 10 and 11, the distance (L) between the ultrasonic oscillators 10 and 11, and the height (H0) are appropriately combined so that the propagation phase difference is about $3\pi/2$ or more. Higher-precision flow measurement is possible if the distance (L) and the height (H0) are fixed. This is because as the frequency of the ultrasonic oscillators 10 and 11 is set higher the propagation phase difference can be made greater.

Thus, according to the present invention, in the ultrasonic flowmeter in which the propagation phase difference between the direct wave and the reflected wave influences the measurement results, by selectively combining the height (H0) of the flow measurement section 7, the distance between the ultrasonic oscillators 10 and 11, and the frequency thereof, the influence of the reflected wave can be reduced with a simple structure, allowing the flow of an object fluid to be measured with high precision over a wide range in a short time so that the propagation phase difference between the propagation route 17 and the propagation route 18 is $3/2\pi$ or more. Moreover, since no concave or convex portion is formed in the flow measurement section 7, neither a disturbance of the flow nor an increase in pressure loss will occur.

In Example 1, the height (H0) at which the propagation phase difference between the propagation routes 17 and 18 is in the range of $0.7\pi$ to $2.2\pi$ was selected. Alternatively, a height (H0) at which the propagation phase difference between the propagation routes 17 and 18 is in the range of $2.2\pi$ or more may be selected. Otherwise, the distance (L) between the ultrasonic oscillators 10 and 11 or the frequency thereof may be selected.

EXAMPLE 2

Hereinbelow, Example 2 according to the present invention will be described with reference to FIGS. 8 and 9.

Figure 8:
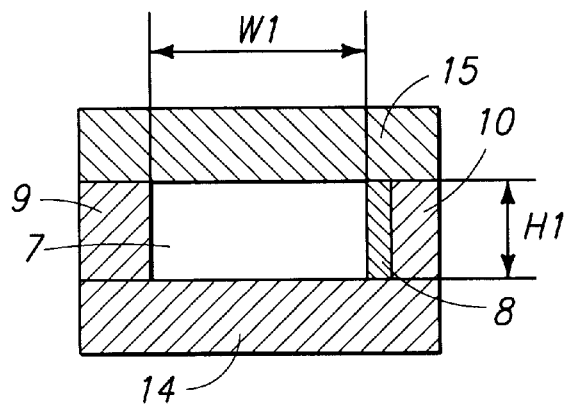
FIG. 8 is a sectional view taken along line a–a' of an ultrasonic flowmeter of Example 2 according to the present invention, viewed from a side thereof.
Figure 9:
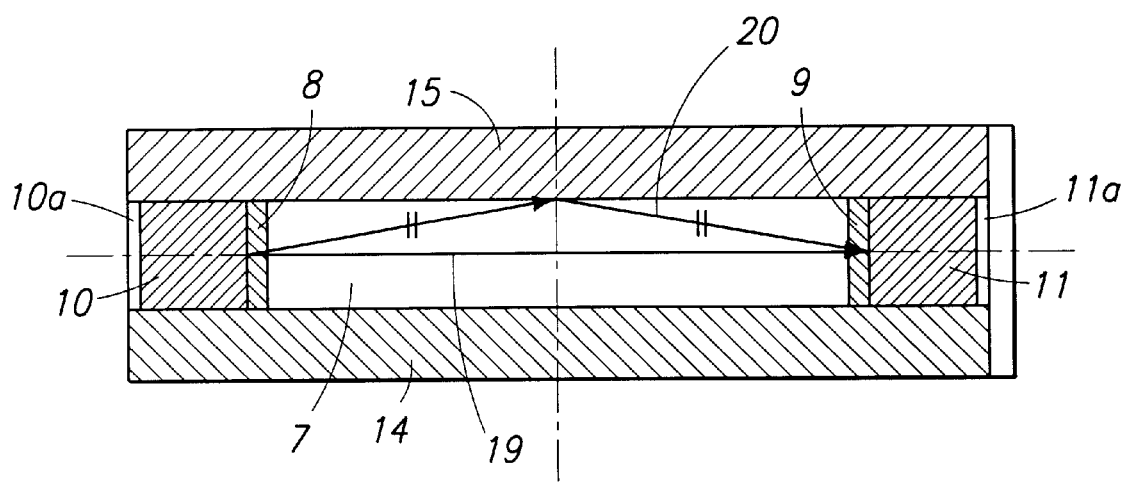
FIG. 9 is a sectional view taken along line b–b' of the above flowmeter, viewed from a side thereof.

FIG. 8 is a cross sectional view taken along line a–a' of the flow path 6 of an ultrasonic flowmeter of Example 2 according to the present invention, viewed from a side thereof. FIG. 9 is a sectional view taken along line b–b' of the flow path 6, viewed from a side thereof. Referring to FIG. 8, the reference numerals 8, 9, 14, and 15 denote the side-wall sections, the lower plate section, and the upper plate section, which are substantially the same configuration of FIG. 2. Referring to FIG. 9, the reference numerals 10 and 11 denote the ultrasonic oscillators, which are substantially the same configuration of FIG. 3. The method for making the flow path of the ultrasonic flowmeter having the above configuration and the operation principle thereof are substantially the same as those of Example 1 and thus omitted here.

In general, in order to reduce the pressure loss, the cross section area of the flow measurement section 7 is made substantially the same as the inner diameter of a pipe for supplying an object fluid, and in some cases it is desired to increase the aspect ratio of the height (H1) to the width (W1) (W1/H1) in view of the flow rate distribution. In such cases, it is sometimes impossible to selectively combine the distance (L) between the ultrasonic oscillators 10 and 11, the height (H1), and the frequency so that the propagation phase difference between a propagation route 19 and a propagation route 20 is $3\pi/2$ or more. Then, a means for reducing the influence of the reflected wave while increasing the aspect ratio is considered.

Figure 10:
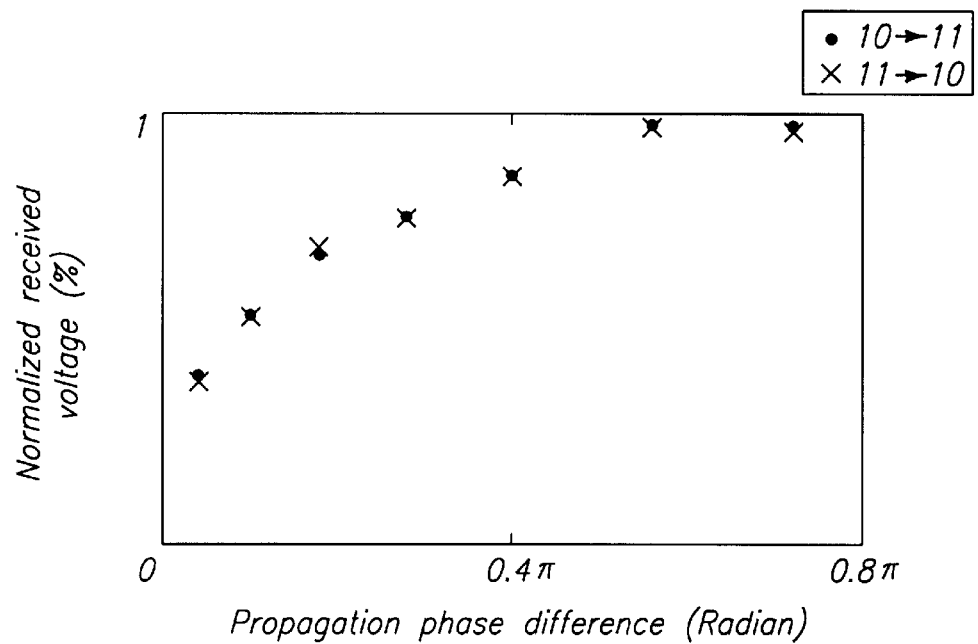
FIG. 10 is a characteristic view illustrating a relative received voltage of the flowmeter.
Figure 11:
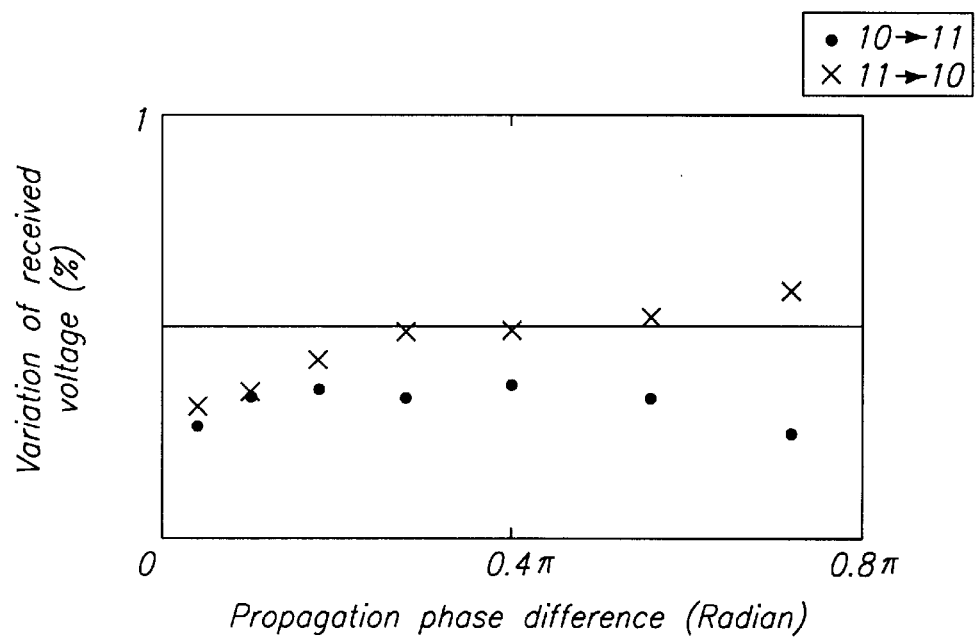
FIG. 11 is a characteristic view illustrating a variation in the received voltage of the flowmeter.

FIGS. 10 and 11 illustrate the results of experiments performed to confirm the influence of the reflected wave on the direct wave. As in Example 1, the experiments were performed using the air under the following conditions: the distance between the ultrasonic oscillators 10 and 11 is L; the effective radiation surfaces of the ultrasonic oscillators 10 and 11 are square; the width is W1 (fixed); and the height (H1) is set so that the propagation phase difference between the propagation routes 19 and 20 is in the range of $0.05\pi$ to $0.7\pi$. The frequency of the ultrasonic oscillators 10 and 11 is 270 kHz.

The transverse axes of FIGS. 10 and 11 represent the propagation phase difference between the propagation route 19 of the direct wave and the propagation route 20 of the reflected wave, calculated from Expression 5. In the calculation, $\lambda$ denotes the wavelength of the ultrasonic oscillators 10 and 11 obtained under no-flow at room temperature. The longitudinal axis of FIG. 10 represents the relative received voltage of the received voltage measured when the ultrasonic oscillators 10 and 11 are disposed in the flow path 6 with respect to the received voltage thereof measured when they are disposed in an open space. The measurement was performed under no flow. The longitudinal axis of FIG. 11 represents the variation of the received voltage obtained under a flow of about 6,000 liters/hour with respect to the received voltage obtained under no flow.

As is observed from FIG. 10, the received voltage is smaller as the propagation phase difference is smaller. This is presumably because, since the effective radiation surfaces of the ultrasonic oscillators 10 and 11 were fixed while the height (H1) was reduced, portions of the ultrasonic oscillators 10 and 11 were blocked by the lower plate section 14 and the upper plate section 15.

As is observed from FIG. 11, when the propagation phase difference is $0.2\pi$ or more, the variation has a difference between the combination of the ultrasonic oscillator 10 as the transmitter and the ultrasonic oscillator 11 as the receiver and the combination of the ultrasonic oscillator 11 as the transmitter and the ultrasonic oscillator 10 as the receiver. On the contrary, when the propagation phase difference is below $0.2\pi$, the variations are substantially equal between the combination of the ultrasonic oscillator 10 as the transmitter and the ultrasonic oscillator 11 as the receiver and the combination of the ultrasonic oscillator 11 as the transmitter and the ultrasonic oscillator 10 as the receiver. The above substantially equal variations indicate that no phase influence is observed in the superimposition of the reflected wave on the direct wave regardless of whether the ultrasonic propagation speed is accelerated or decelerated by the flow. It is therefore considered that the influence of the reflected wave on the direct wave was reduced.

From the above results, it is found that the influence of the reflected wave can be reduced to realize high-precision flow measurement over a wide range if the frequency of the ultrasonic oscillators 10 and 11, the distance (L) between the ultrasonic oscillators 10 and 11, and the height (H1) are appropriately combined so that the propagation phase difference between the propagation routes 19 and 20 is about $0.2\pi$ or less. Higher-precision flow measurement is possible if the distance (L) and the height (H1) are fixed. This is because as the frequency of the ultrasonic oscillators 10 and 11 is set lower the propagation phase difference can be made smaller.

In Example 2, the height (H1) at which the propagation phase difference between the propagation routes 19 and 20 is in the range of $0.05\pi$ to $0.7\pi$ was selected. Alternatively, a height (H1) at which the propagation phase difference between the propagation routes 19 and 20 is $0.05\pi$ or less may be selected. Otherwise, the distance (L) between the ultrasonic oscillators 10 and 11 or the frequency thereof may be selected.

EXAMPLE 3

Hereinbelow, Example 3 according to the present invention will be described with reference to the relevant drawings.

Figure 12:
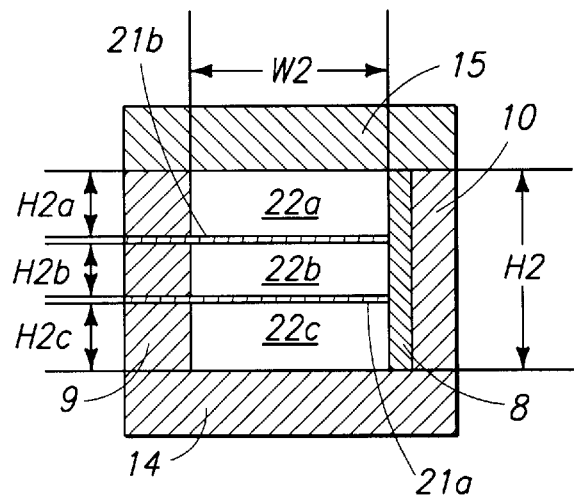
FIG. 12 is a sectional view taken along line a–a' of an ultrasonic flowmeter of Example 3 according to the present invention, viewed from a side thereof.

FIG. 12 is a sectional view taken along line a–a' of the flow path 6 of an ultrasonic flowmeter in Example 3 according to the present invention, viewed from a side thereof. Referring to FIG. 12, the reference numerals 8, 9, 14, and 15 denote the side-wall sections, the lower plate section, and the upper plate section of the flow path 6, which are substantially the same configuration of FIG. 2. The different point from the configuration of FIG. 2 is that the cross section of the flow measurement section is divided by partition plates 21a and 21b into three portions to form divided flow measurement portions 22a to 22c.

When the aspect ratio of the height (H2) to the width (W2) (W2/H2) is made larger while the cross section area of the flow measurement section 7 is substantially equal to the inner diameter of a pipe for supplying an object fluid, it is sometimes difficult to reduce the size of the flow path 6. In order to overcome this problem, a means for dividing the cross section of the flow measurement section 7 into a plurality of portions so as to increase the aspect ratio of the height to the width of the respective divided flow measurement portions is considered.

First, an example of the method for making the flow path 6 of the ultrasonic flowmeter will briefly be described. In the flow measurement section 7 whose aspect ratio of the height (H2) to the width (W2) (W2/H2) is 5, for example, the partition plates 21a and 21b made of SUS having a thickness of 0.2 mm are secured to the side-wall sections 8 and 9 with an adhesive so as to be parallel with the inner surface of the lower plate section 14. After the securement of the partition plates 21a, 21b to the side-wall sections 8, 9, the upper plate section 15 is screwed to the end surfaces of the side-wall sections 8, 9 via sealants. Respective heights (H2a, H2b, H2c) are set so that the aspect ratio of the divided flow measurement portions (22a, 22c) is about 20 and the aspect ratio of the divided flow measurement portion (22b) is about 17.

The distance (L) between the ultrasonic oscillators 10, 11 is selected so that a propagation phase difference of about $0.04\pi$ is generated between a propagation route 23 and a propagation route 24 in the divided flow measurement portion (22b), and that a propagation phase difference of about $0.1\pi$ is generated between a propagation route 25 and a propagation route 26 in the divided flow measurement portion (22a). It is assumed that the effective radiation surfaces of the ultrasonic oscillators 10, 11 are square and that the frequency thereof is 270 kHz. The method for mounting the ultrasonic oscillators in the ultrasonic flowmeter having the above configuration, as well as the operation principle thereof, are substantially the same as those of Example 1, and thus omitted here.

Figure 13:
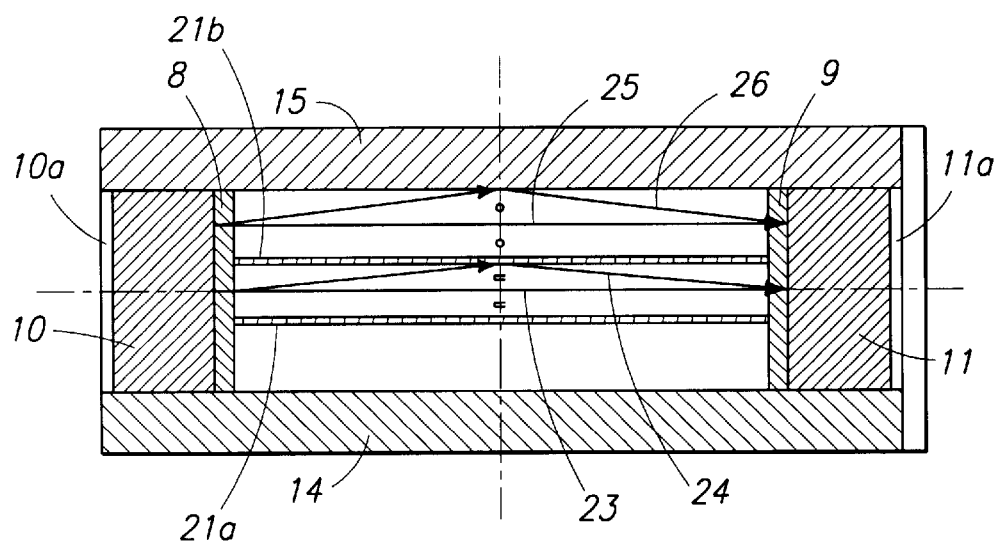
FIG. 13 is a sectional view taken along line b–b' of the above flowmeter, viewed from a side thereof.

Then, the propagation of an ultrasonic wave in the divided flow measurement portions 22 will be described using the propagation routes 23 to 26 shown in FIG. 13. It should be understood that the propagation routes 23 to 26 represent typical propagation routes. There exist other propagation routes not shown, as described in Example 1. FIG. 13 is a sectional view taken along line b–b' of the flow path 6, viewed from a side thereof.

In the divided flow measurement portion 22b, a direct wave propagates along a route such as the propagation route 23, and a reflected wave propagates along a route such as the propagation route 24 where they are reflected from the partition plate 21b. Likewise, in the divided flow measurement portion 22a, a direct wave propagates along a route such as the propagation route 25, and a reflected wave propagates along a route such as the propagation route 26 where they are reflected from the upper plate section 15. Since the height (H2c) of the flow measurement portion 22c is set to be equal to the height (H2a) of the divided flow measurement portion 22a, the relationship between direct waves and reflected waves is substantially the same as that in the divided flow measurement portion 22a.

The ultrasonic oscillator 11 observes a synthetic wave of all the direct waves and reflected waves propagating inside the divided flow paths (H2a, H2b, H2c) as a received wave. As described in Example 2, the heights of the divided flow measurement portions (22a to 22c) are set so that the propagation phase difference between the direct wave and the reflected wave is $0.2\pi$ or less. Accordingly, the phase relationships in the superimposition of the direct waves and the reflected waves are not influenced by the flow, thereby reducing the influence of the reflected wave on direct wave.

An experiment was performed where the flow measurement section is divided into three portions as well as the configuration described above and the air as an object fluid is flowed at about 6,000 liters/hour. It was confirmed from the results of the experiment that the variation in the case of the combination of the ultrasonic oscillator 10 as the transmitter and the ultrasonic oscillator 11 as the receiver is substantially equal to the variation in the case of the combination of the ultrasonic oscillator 11 as the transmitter and the ultrasonic oscillator 10 as the receiver.

Thus, according to the present invention, the influence of the reflected wave can be reduced by dividing the flow measurement section into a plurality of portions using a partition plate. Moreover, the stabilization of the flow can be achieved, allowing the flow of an object fluid to be measured with high precision in a short time.

In Example 3, although the flow measurement section was divided into three portions, the flow measurement section may be divided into two, four or more -portions as long as the phase difference between the direct wave and the reflected wave can be reduced. The values of the heights (H2a to H2c) may be changed appropriately. In this example, ultrasonic waves are assumed to propagate in all the divided flow measurement portions. However, the ultrasonic waves do not have to propagate in all the divided measurement portions as long as the precision of the flow measurement is satisfactory.

EXAMPLE 4

Hereinbelow, Example 4 according to the present invention will be described with reference to the relevant drawing.

Figure 14:
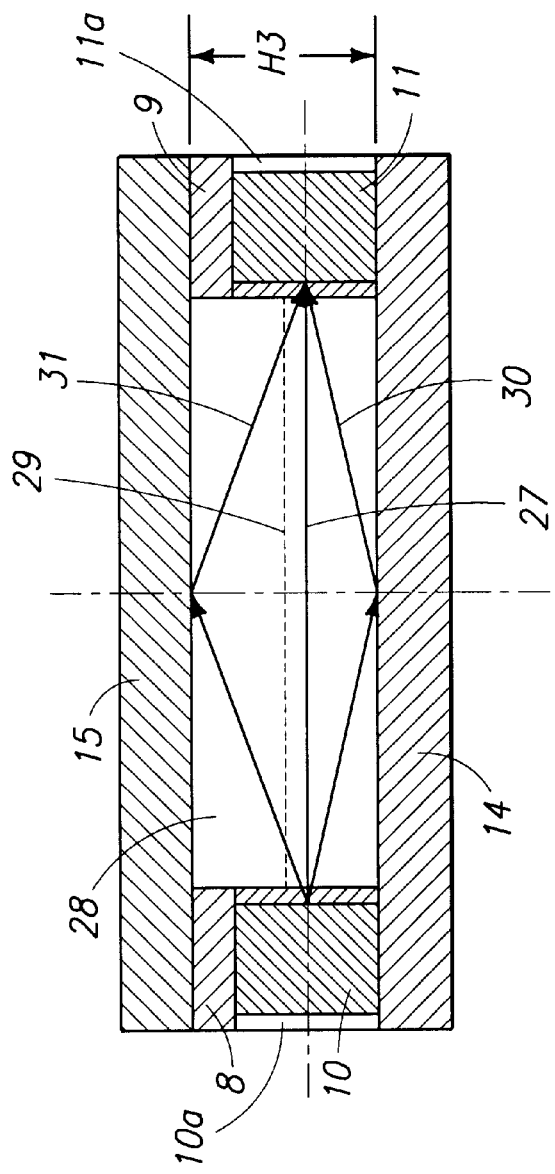
FIG. 14 is a sectional view taken along line b–b' of an ultrasonic flowmeter of Example 4 according to the present invention, viewed from a side thereof.

FIG. 14 is a sectional view taken along line b–b' of the flow path 6 of an ultrasonic flowmeter of Example 4 according to the present invention, viewed from a side thereof. Referring to FIG. 14, the reference numerals 8, 9, 14, 15 denote the side-wall sections, the lower plate section, and the upper plate section of the flow path 6, which are substantially the same configuration of FIG. 3. The difference from the configuration of FIG. 3 is that the ultrasonic oscillators 10, 11 are disposed in the side-wall sections 8 and 9 so that a line 27 connecting the centers of the ultrasonic oscillators 10, 11 and a center line 29 of a height (H3) are parallel with each other but do not match with each other.

In order to obtain a high-precision flowmeter, reducing the influence of the reflected wave is required. For this purpose, it is considered to generate a propagation phase difference between the reflected wave from the inner surface of the lower plate section 14 and the reflected wave from the upper plate section 15. As one of methods for realizing this, the line 27 connecting the centers of the pair of ultrasonic oscillators is shifted in parallel from the center line 29 of the height (H3) of a flow measurement section 28, so that the reflected wave from the inner surface of the lower plate section 14 and the reflected wave from the upper plate section 15 reach the ultrasonic oscillator at different phases, respectively.

An example of the method for making the flow path of the ultrasonic flowmeter having the above configuration will be described. For example, the ultrasonic oscillators 10, 11 are screwed to the side-wall sections 8, 9 via sealants so that the propagation phase difference between a propagation route 27 of a direct wave and a propagation route 30 of a reflected wave reflected from the lower plate section 14 is $0.7\pi$ and the propagation phase difference between the propagation route 27 and a propagation route 31 of a reflected wave reflected from the upper plate section 15 is $2.2\pi$. The upper plate section 15 is screwed to the end surfaces of the side-wall sections 8, 9 via sealants. The distance between the ultrasonic oscillators 10, 11, the shape of the effective radiation surfaces thereof, the frequency thereof, and the object fluid are the same as those in Example 1. The operation principle of the ultrasonic flowmeter having the above configuration is substantially the same as that in Example 1, and thus omitted here.

The propagation of an ultrasonic wave in the flow measurement section 28 will be described using exemplary propagation routes. A direct wave propagates along the line 27 connecting the centers of the ultrasonic oscillators. Reflected waves have the propagation route 30 reflected from the inner surface of the lower plate section 14 and the propagation route 31 reflected from the inner surface of the upper plate section 15. Such reflected waves are received at around the center of the ultrasonic oscillator 11. The illustrated propagation routes of the directed wave and the reflected waves are typical propagation routes. As in Example 1, there exist other propagation routes not shown. If the line 27 connecting the centers and the center line 29 match with each other, the propagation distances of the propagation route 30 and the propagation route 31 are equal to each other, generating no propagation phase difference. On the contrary, if the line 27 connecting the centers and the center line 29 do not match with each other, the propagation distances of the propagation route 30 and the propagation route 31 are different from each other, generating a propagation phase difference. Accordingly, these reflected waves interfere and influence each other, resulting in reducing the influence of the reflected waves on the direct waves.

In an experiment performed under the above configuration by flowing the air at about 6,000 liters/hour, it was confirmed that substantially the same results as those shown in FIG. 8, where the propagation phase difference is 2.2π, were obtained.

Thus, according to the present invention, the propagation phase difference of the reflected wave reflected from the lower plate section can be made different from that of the reflected wave reflected from the upper plate section by disposing the ultrasonic oscillators so that the line connecting the centers thereof is shifted in parallel from the center line of the height (H3) of the flow measurement section. This reduces the influence of the reflected wave on the direct wave and thus enables measurement of the flow of an object fluid with high precision in a short time.

In Example 4, the line 27 connecting the centers of the ultrasonic oscillators was shifted in parallel from the center line 29 of the height (H3) of the flow measurement section so that the propagation phase difference between the propagation route 27 of the direct wave and the propagation route 30 of the reflected wave reflected from the lower plate section 14 is 0.7π and the propagation phase difference between the propagation route 27 and the propagation route 31 of the reflected wave reflected from the upper plate section 15 is 2.2π. The present invention is not limited to the above conditions, but the conditions can be appropriately changed.

EXAMPLE 5

Hereinbelow, Example 5 according to the present invention will be described with reference to the relevant drawing.

Figure 15:
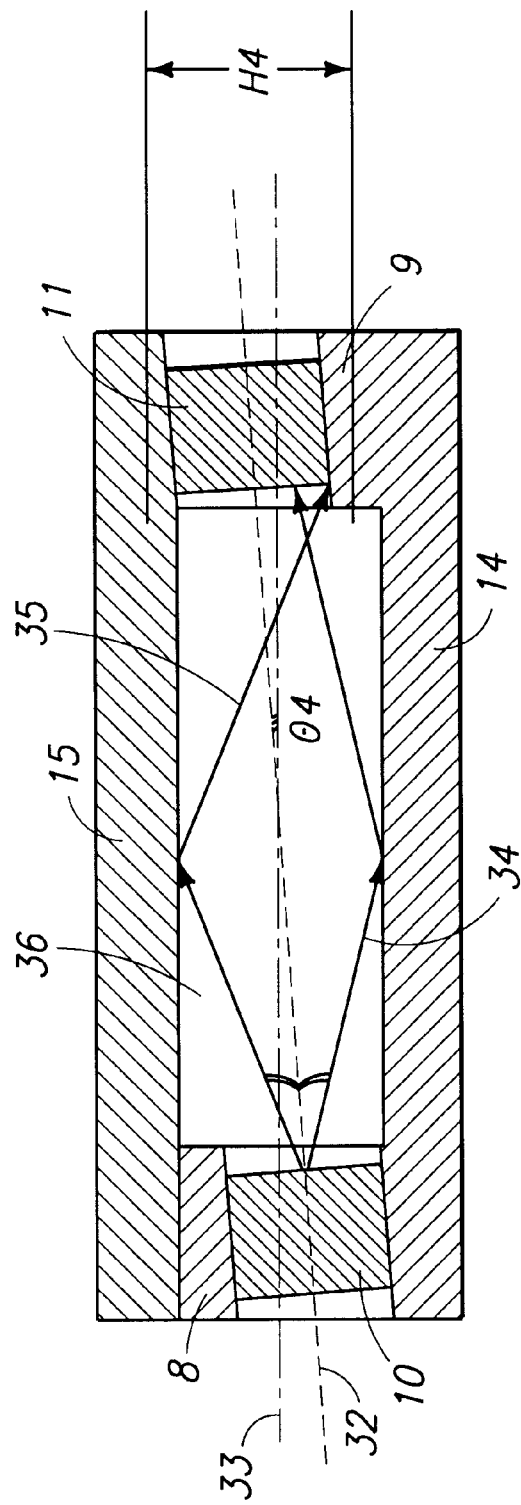
FIG. 15 is a sectional view taken along line b–b' of an ultrasonic flowmeter of Example 5 according to the present invention, viewed from a side thereof.

FIG. 15 is a sectional view taken along line b–b' of the flow path 6 of an ultrasonic flowmeter of Example 5 according to the present invention, viewed from a side thereof. Referring to FIG. 15, the reference numerals 8, 9, 14, 15 denote the side-wall sections, the lower plate section, and the upper plate section of the flow path 6, which are substantially the same configuration of FIG. 3. The difference from the configuration of FIG. 3 is that the ultrasonic oscillators 10, 11 are disposed in an inclined state so that a line 32 connecting the centers of the ultrasonic oscillators 10, 11 and a center line 33 of a height (H4) of a flow measurement section 36 cross at a predetermined angle (θ4).

As in Example 4, in order to obtain a high-precision flowmeter, reducing the influence of the reflected wave is required. To achieve this, it is considered to generate a propagation phase difference between the reflected wave from the inner surface of the lower plate section 14 and the reflected wave from the upper plate section 15. One of methods for generating the propagation phase difference selected by this example is disposing the ultrasonic oscillators 10, 11 so that the line 32 connecting the centers of the ultrasonic oscillators 10, 11 and the center line 33 of the height (H4) at the predetermined angle (θ4).

An example of the method for making the flow path of the ultrasonic flowmeter having the above configuration will be described. For example, the ultrasonic oscillators 10, 11 are screwed to the side-wall sections 8, 9 via sealants so that the line 32 connecting the centers of the ultrasonic oscillators 10, 11 is inclined by about 2.5 degrees with respect to the center line 33 of the height (H4). The upper plate section 15 is then screwed to the end surfaces of the side-wall sections 8, 9 via sealants. The distance between the ultrasonic oscillators 10, 11, the shape of the effective radiation surfaces thereof, the frequency thereof, and the object fluid are the same as those in Example 1. The operation principle of the ultrasonic flowmeter having the above configuration is substantially the same as that described in Example 1, and thus omitted here.

The propagation of an ultrasonic wave in the flow measurement section 36 will be described using exemplary propagation routes. A direct wave propagates along the line 32 connecting the centers, for example. As typical propagation routes for reflected waves, a propagation route 34 and a propagation route 35 extend from around the center of the ultrasonic oscillator 10 in directions toward the lower plate section 14 and the upper plate section 15, respectively, crossing the same angle. The illustrated propagation routes of the directed wave and the reflected waves are typical propagation routes. As in Example 1, there exist other propagation routes not shown. An ultrasonic wave propagating along the propagating route 34 is reflected from the lower plate section 14, and an ultrasonic wave propagating along the propagating route 35 is reflected from the upper plate section 15. The reflected waves propagating along the propagation route 34 and the propagation route 35 generates a propagation phase difference since they have different propagation distances.

If the line 32 connecting the centers and the center line 33 match with each other, the propagation distances of the propagation route 34 and the propagation route 35 are equal to each other. This generates no propagation phase difference, and the ultrasonic oscillator 11 receives both the reflected waves at the same position thereof. In this example, however, since the line 32 connecting the centers and the center line 33 are inclined from each other by 2.5 degrees, the propagation distances of the propagation route 34 and the propagation route 35 are different from each other, causing a propagation phase difference. Moreover, the ultrasonic oscillator 11 receives the reflected waves at different positions. Accordingly, these reflected waves interfere and influence with each other, resulting in reducing the influence of the reflected waves on the direct wave.

In Example 5, the line 32 connecting the centers of the ultrasonic oscillators 10, 11 is inclined by about 2.5 degrees against the center line 33 of the height (H4). The present invention is not limited to the above condition, but the inclination angle may be larger or smaller than 2.5 degrees.

EXAMPLE 6

Hereinbelow, Example 6 according to the present invention will be described with reference to the relevant drawings.

Figure 16:
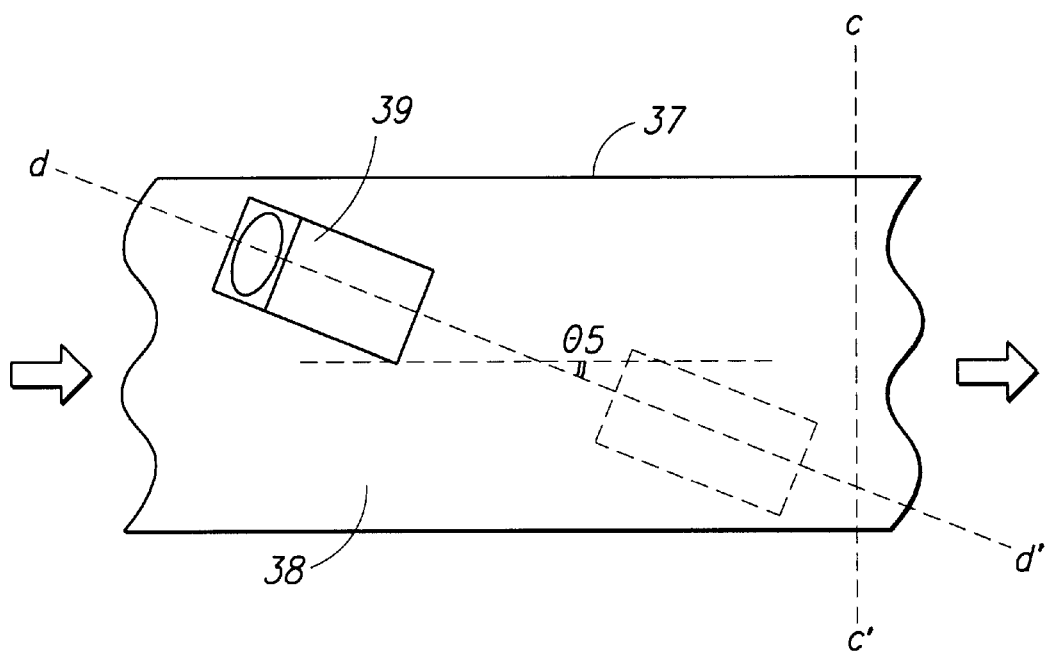
FIG. 16 is a top view of an ultrasonic flowmeter of Example 6 according to the present invention.
Figure 17:
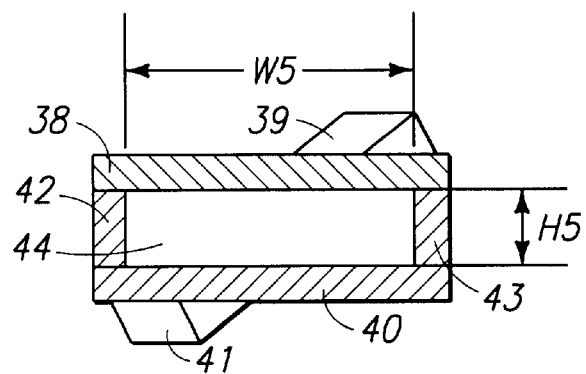
FIG. 17 is a sectional view taken along line c–c' of the above flowmeter, viewed from a side thereof.
Figure 18:
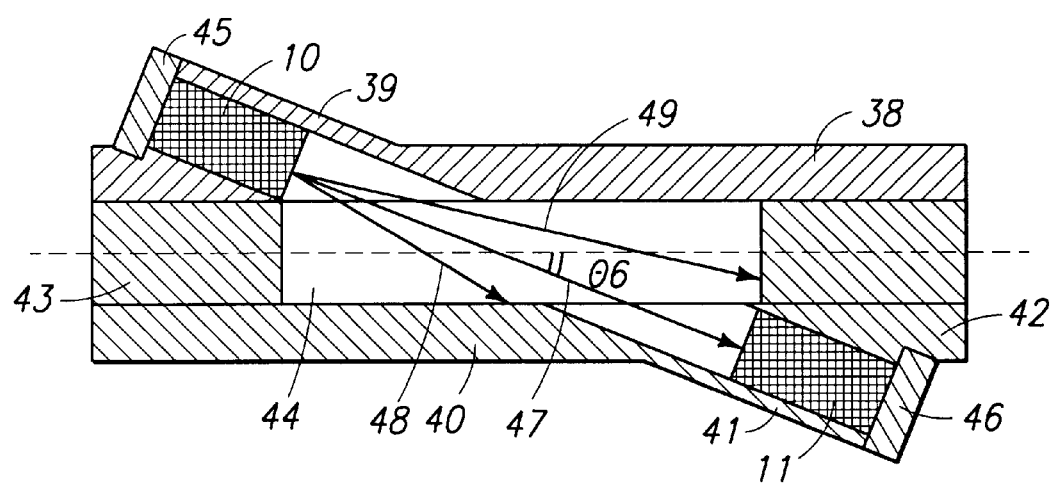
FIG. 18 is a sectional view taken along line d–d' of the above flowmeter, viewed from a side thereof.

FIG. 16 is a top view of a flow path of an ultrasonic flowmeter of Example 6 according to the present invention. FIG. 17 is a sectional view taken along line c–c' of the flow path in FIG. 16, viewed from a side thereof. FIG. 18 is a sectional view taken along line d–d' of the flow path in FIG. 16, viewed from a side thereof. In these figures, the reference numeral 37 denotes a flow path, 38 denotes an upper plate section of the flow path 37, 39 denotes a mount a for the ultrasonic oscillator 10 provided on the upper plate section 38, 40 denotes a lower plate section of the flow path 37, 41 denotes a mount b for the ultrasonic oscillator 11 provided on the lower plate section 40, 42 and 43 denote side-wall sections of the flow path 37, and 44 denotes a flow measurement section.

In order to obtain a high-precision flowmeter, reducing the influence of the reflected wave is required. It is particularly important to reduce the influence of the once reflected wave among the reflected waves. In some cases, it is desired to increase the aspect ratio of the height (H5) to the width (W5) (W5/H5) in the view of the flow rate distribution. In order to achieve the above, it is considered that a method for disposing a pair of ultrasonic oscillators at positions where a reflected wave which is reflected only once in the flow measurement section 44 is not generated irrespective of the shape of the flow measurement section 44 is considered.

An example of the method for making the flow path of the ultrasonic flowmeter having the above configuration will be described. The upper plate section 38, the lower plate section 40, the mounts 39, 41, and the side-wall sections 42, 43 constituting the flow path 37 are made of a material which is free from a chemical change against an object fluid. In this example, since the air, for example, was used as the object fluid, an ABS resin was selected as the material. First, the mount 39 is adhered to the upper plate section 38 so that the angle (θ5) crossing the direction of the longitudinal axis of the upper plate section 38 and a direction d–d' of the mounting of the ultrasonic oscillator 10 is 30 degrees, for example. Likewise, the mount 41 is adhered to the lower plate section 40 so that the angle (θ5) crossing the direction of the longitudinal axis of the lower plate section 40 and the direction d–d' of the mounting of the ultrasonic oscillator 11 is 30 degrees. The upper plate section 38 is screwed to the end surfaces of the side-wall sections 42, 43 via sealers, to constitute the flow measurement section 44 whose cross section shape is a rectangle. The ultrasonic oscillators 10, 11 are then secured to the mounts 39, 41 via sealers 45, 46 so that the angle (θ6) crossing a line 47 connecting the centers of the ultrasonic oscillators 10, 11 and a center line of the height (H5) of the d–d' cross section is 30 degrees. The distance between the ultrasonic oscillators 10, 11, the shape of the effective radiation surfaces thereof, and the frequency thereof are substantially the same as those in Example 1. The operation principle of the ultrasonic flowmeter having the above configuration is substantially the same as that described in Example 1, and thus omitted here.

The propagation of an ultrasonic wave in the flow measurement section 44 will be described using exemplary propagation routes 47 to 49 shown in FIG. 18. The propagation routes 47 to 49 are typical propagation routes. There exist other propagation routes not shown. A direct wave transmitted from the ultrasonic oscillator 10 propagates along the propagation route 47 toward the ultrasonic oscillator 11. As the ultrasonic waves transmitted from the ultrasonic oscillator 10 propagate, they generally spread, and thus, some of them propagate along the propagation routes 48 and 49. However, an ultrasonic wave which propagates along the propagation route 48 and is reflected from the lower plate section 40 will never reach the ultrasonic oscillator 11 after being reflected again from the wall of the flow measurement section 44. Likewise, an ultrasonic wave which propagates along the propagation route 49 and is reflected from the side-wall section 42 will never reach the ultrasonic oscillator 11 after being reflected again from the wall of the flow measurement section 44. In the ultrasonic oscillators 10, 11 disposed in the above positional relationship, no reflected wave which is reflected only once from the flow measurement section 44 is received by the ultrasonic oscillator 11. Therefore, reflected waves which influence on direct waves have been reflected twice or more. A reflected wave which was reflected twice or more influences on a direct wave considerably less than a reflected wave which was reflected only once. This reduce the influence of the reflected wave.

In an experiment performed using the flow measurement section 44 having the above configuration by flowing the air as the object fluid at about 6,000 liters/hour, it was confirmed that substantially the same results as those in Example 1, where the propagation phase difference is 2.2π, were obtained. From the above results, it is found that the flow of an object fluid can be measured with high precision over a wide range, irrespective of the cross section size of the flow measurement section 44, by disposing the pair of ultrasonic oscillators 10, 11 at positions where the angles (θ5, θ6) are formed with respect to the direction of the longitudinal axis of the flow path 37 and the direction of the height (H5) of the flow measurement section 44, respectively, and no once reflected wave is generated.

In Example 6, although the angle (θ5) crossing the direction of the longitudinal axis of the flow path 37 and the direction d–d' of the mounting of the ultrasonic oscillators was set at 30 degrees, and the angle (θ6) crossing the line 47 connecting the pair of ultrasonic oscillators and the center line of the height (H5) was set at 30 degrees, the present invention is not limited to the above conditions, but an appropriate angle can be used.

EXAMPLE 7

Hereinbelow, Example 7 according to the present invention will be described with reference to the relevant drawings.

Figure 19:
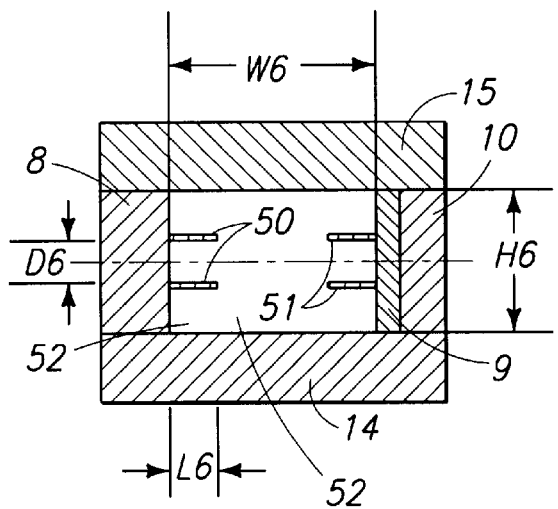
FIG. 19 is a sectional view taken along line a–a' of an ultrasonic flowmeter of Example 7 according to the present invention, viewed from a side thereof.

FIG. 19 is a sectional view taken along line a–a' of the flow path 6 of an ultrasonic flowmeter of Example 7, viewed from a side thereof. Referring to FIG. 19, the reference numerals 8, 9, 14, 15 denote the side-wall sections, the lower plate section, and the upper plate section of the flow path 6, which are substantially the same configuration of FIG. 2. The difference from the configuration of FIG. 2 is that structures 50, 51 having a size which does not divide a flow measurement section 52 into layers are attached to the side-wall sections 8, 9.

In order to reduce the influence of the reflected wave, the method is considered to provide a reflection plate in the flow measurement section 52 so that the propagation phase difference between the direct wave and the reflected wave can be set at a desired value.

An example of the method for making the flow path of the ultrasonic flowmeter having the above configuration will be described. For example, in the flow measurement section 52, two structures 50a, 50b made of stainless steel (SUS) having a thickness of 0.2 mm and a length (L6) of 7 mm are secured with an adhesive to the side-wall section 8 where the ultrasonic oscillator 10 is disposed so as to be parallel with the inner surface of the lower plate section 14. Likewise, structures 51a, 51b are secured with an adhesive to the side-wall section 9 where the ultrasonic oscillator 11 is disposed. After the securement of the structures 50 and the structures 51 to the side-wall sections 8 and 9, the upper plate section 15 is screwed to the end surfaces of the side-wall sections 8 and 9 via sealers. The distance between the ultrasonic oscillators 10, 11, the shape of the effective radiation surfaces thereof, the frequency thereof, and the object fluid are the same as those in Example 1. The method for mounting the ultrasonic oscillators to the ultrasonic flowmeter having the above configuration, as well as the operation principle of the ultrasonic flowmeter, are substantially the same as those described in Example 1, and thus omitted here.

Figure 20:
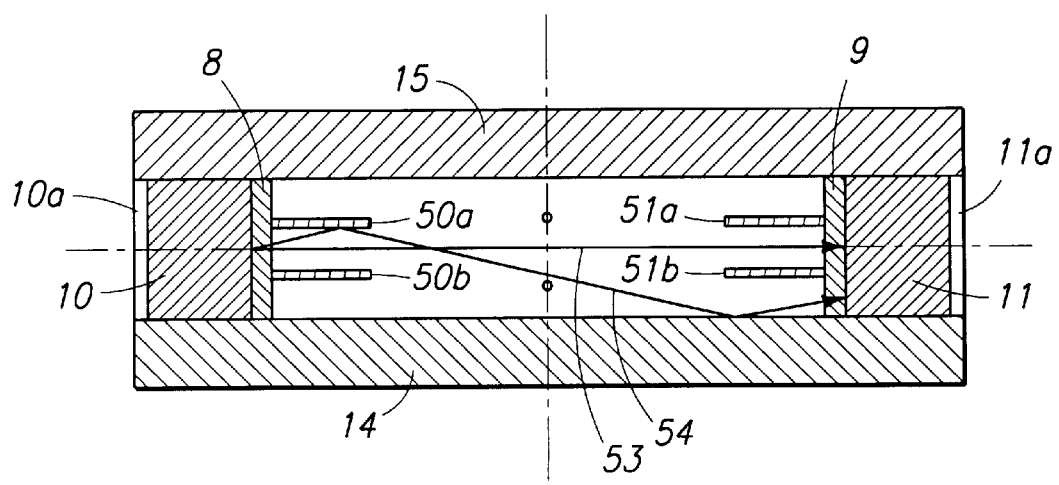
FIG. 20 is a sectional view taken along line b–b' of the above flowmeter, viewed from a side thereof.

The propagation of an ultrasonic wave in the flow measurement section 52 will be described using exemplary propagation routes 53 and 54 shown in FIG. 20. The propagation routes 53 and 54 are typical propagation routes. There exist other propagation routes not shown as well as Example 1. FIG. 20 is a sectional view taken along line b–b' of the flow path 6, viewed from a side thereof. A direct wave propagates along the propagation route 53. A reflected wave propagates along the propagation route 54, for example, where it is repeatedly reflected from the structure 50a and then from the lower plate section 14. The reflected wave propagating along the propagation route 54 has a longer propagation distance than a reflected wave which is reflected only once from the upper plate section 15. There also exists propagation routes of reflected waves of which receipt is blocked by the structures 51 though they are not shown. This reduce the influence of the reflected wave on the direct wave.

As described above, according to the present invention, the propagation phase difference between the direct wave and the reflected wave can be set at a desired value by providing the structures. This allows to reduce the influence of the reflected wave and perform a high-precision measurement of the flow of an object fluid in a short time.

In Example 7, the structures made of SUS having a thickness of 0.2 mm and a length (L6) of 7 mm were used. The present invention is not limited to the above conditions, but appropriate size and material can be used. In this example, the structures 50, 51 were adhered to the side-wall sections 8, 9. Alternatively, the structures may be disposed at positions other than the side-wall sections 8, 9. In this example, a total of four structures were used. Alternatively, any number of structures, which is one or more, may be used.

EXAMPLE 8

Hereinbelow, Example 8 according to the present invention will be described with reference to the relevant drawings.

Figure 21:
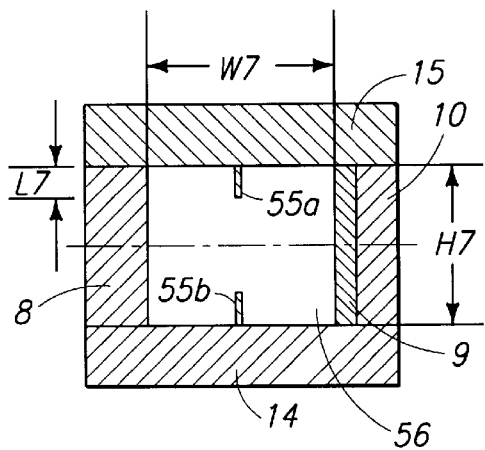
FIG. 21 is a sectional view taken along line a–a' of an ultrasonic flowmeter of Example 8 according to the present invention, viewed from a side thereof.

FIG. 21 is a sectional view taken along line a–a' of the flow path 6 of an ultrasonic flowmeter of Example 8, viewed from a side thereof. Referring to FIG. 21, the reference numerals 8, 9, 14, 15 denote the side-wall sections, the lower plate section, and the upper plate section of the flow path 6, which are substantially the same configuration of FIG. 2. The difference from the configuration of FIG. 2 is that structures 55a, 55b which do not divide a flow measurement section 56 into layers are disposed on the lower plate section 14 and the upper plate section 15.

In order to obtain a high-precision flowmeter, reducing the influence of the reflected wave is required. To achieve this, the method is considered to provide a reflection plate in the flow measurement section 56 so that the reflected wave is less easily received.

An example of the method for making the flow path of the ultrasonic flowmeter having the above configuration will be described. Structures 55a, 55b made of SUS having a thickness of 0.2 mm and a length (L7) of 1 mm are secured with an adhesive around the center of the width (W7) so as to be perpendicular to the inner surfaces of the lower plate section 14 and the upper plate section 15. After the securement of the structures 55, the upper plate section 15 is screwed to the end surfaces of the side-wall sections 8 and 9 via sealers. The distance between the ultrasonic oscillators 10, 11, the shape of the effective radiation surfaces thereof, the frequency thereof, and the object fluid are the same as those in Example 1. The method for mounting the ultrasonic oscillators in the ultrasonic flowmeter having the above configuration and the operation principle of the ultrasonic flowmeter are substantially the same as those described in Example 1, and thus omitted here.

Figure 22:
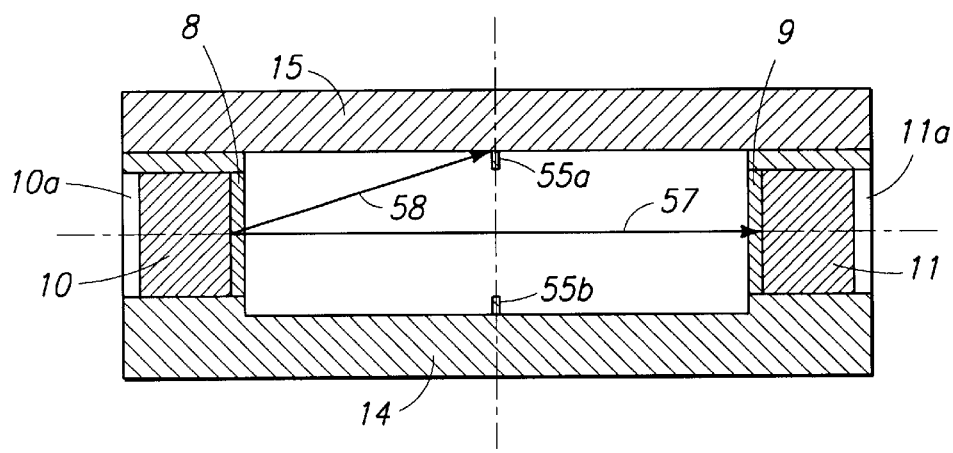
FIG. 22 is a sectional view taken along line b–b' of the above flowmeter, viewed from a side thereof.

The propagation of an ultrasonic wave in the flow measurement section 56 will be described using exemplary propagation routes 57 and 58 shown in FIG. 22. The propagation routes 57 and 58 are typical propagation routes. However, there exist other propagation routes not shown as well as Example 1. FIG. 22 is a sectional view taken along line b–b' of the flow path 6, viewed from a side thereof. An ultrasonic wave transmitted from the ultrasonic oscillator 10 propagates and spreads. For example, a direct wave propagates along the propagation route 57. A spread ultrasonic wave is reflected from the upper plate section 15 and the lower plate section 14, to be received by the ultrasonic oscillator 11 as a reflected wave. However, by providing the structure 55a on the upper plate section 15, the propagation of a reflected wave propagating along the propagation route 58, for example, is blocked by the structure 55a. Therefore, the reflected wave propagating along the propagation route 58 is not received by the ultrasonic oscillator 11. Although propagation routes other than the propagation route 58 exist for reflected waves, some propagations of the reflected waves can be blocked by the structures 55a, 55b. This allows to reduce the influence of the reflected wave on the direct wave.

Thus, according to the present invention, since some propagations of the reflected waves can be blocked by structures, the influence of the reflected waves can be reduced by appropriately selecting the positions and the number of structures provided. This enables a high-precision measurement of the flow of an object fluid in a short time.

In Example 8, although the structures 55a, 55b made of SUS having a thickness of 0.2 mm and a length (L7) of 1 mm were disposed around the center of the width (W7), the present invention is not limited to the above conditions, but appropriate size, position, and material can be used. In this example, the structures 55a, 55b were adhered to the lower plate section 10 and the upper plate section 15. Alternatively, the structures may be disposed at positions other than the lower plate section and the upper plate section. In this example, two structures were provided. Alternatively, any number of structures, which is one or more, may be used.

EXAMPLE 9

Hereinbelow, Example 9 according to the present invention will be described with reference to the relevant drawings.

Figure 23:
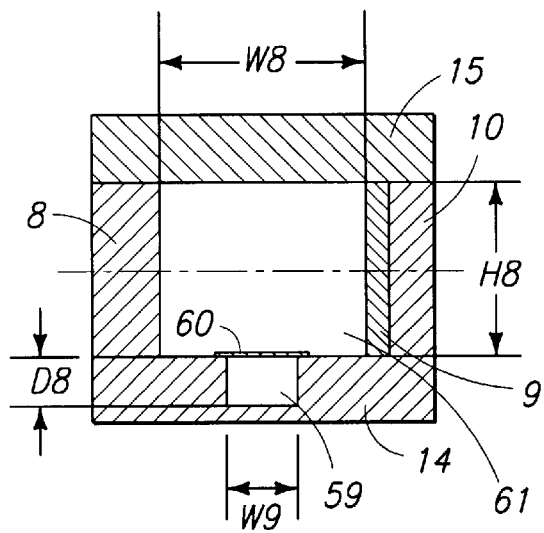
FIG. 23 is a sectional view taken along line a–a' of an ultrasonic flowmeter of Example 9 according to the present invention, viewed from a side thereof.

FIG. 23 is a sectional view taken along line a–a' of the flow path 6 of an ultrasonic flowmeter of Example 9, viewed from a side thereof. Referring to FIG. 23, the reference numerals 8, 9, 14, 15 denote the side-wall sections, the lower plate section, and the upper plate section of the flow path 6, which are substantially the same configuration of FIG. 2. The difference from the configuration of FIG. 2 is that a concave portion 59 is formed in the lower plate section 14, and is covered by a mesh structure 60.

In order to reduce the influence of the reflected wave with increasing the aspect ratio of the height (H8) to the width (W8) of a flow measurement section 61 (W8/H8), the method is considered to form a concave portion in the flow measurement section 61 and a mesh structure covering the concave portion so that the flow is not disturbed by the concave portion.

An example of the method for making the flow path of the ultrasonic flowmeter having the above configuration will be described. The concave portion 59 is formed using a fraise around the center of the lower plate section 14 of the flow measurement section 61 of which aspect ratio (W8/H8) is 5, for example, so that the propagation phase difference between a propagation route 62 and a propagation route 63 is 2.2π. A mesh structure which covers the concave portion 59 is secured to prevent the air as the object fluid from flowing thereinto. The mesh structure should have a mesh size of No. 100, for example, to allow an ultrasonic wave to pass therethrough. The upper plate section 15 is screwed to the end surfaces of the side-wall sections 8, 9 via sealers so that the propagation phase difference between the propagation route 62 and a propagation route 64 is 1.2π. The distance between the ultrasonic oscillators 10, 11, the shape of the effective radiation surfaces thereof, the frequency thereof, and the object fluid are the same as those in Example 1. The method for mounting the ultrasonic oscillators in the ultrasonic flowmeter having the above configuration and the operation principle of the ultrasonic flowmeter, are substantially the same as that described in Example 1, and thus omitted here.

Figure 24:
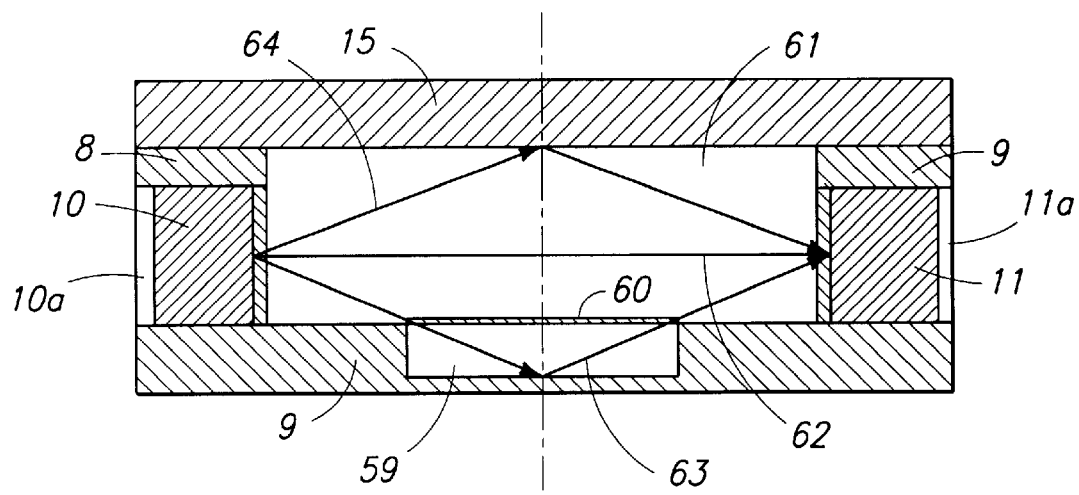
FIG. 24 is a sectional view taken along line b–b' of the above flowmeter, viewed from a side thereof.

The propagation of an ultrasonic wave in the flow measurement section 61 will be described using exemplary propagation routes shown in FIG. 24. FIG. 24 is a sectional view taken along line b–b' of the flow path 6, viewed from a side thereof. A direct wave propagates along the propagation route 62. A reflected wave reflected from the lower plate section 14 propagates along the propagation route 63, for example, where it is reflected from the bottom of the concave portion 59. A reflected wave reflected from the upper plate section 15 propagates along the propagation route 64, for example. Although the propagation routes 62 to 64 are typical propagation routes, there exist other propagation routes not shown, as well as Example 1. Some reflected waves are reflected from the surface of the mesh structure 60 without passing through the mesh structure 60.

Since the propagation phase difference between the propagation route 62 and the propagation route 63 is set at 2.2π, while the propagation phase difference between the propagation route 62 and the propagation route 64 is set at 1.2π, the propagation route distributions of these reflected waves are different. These result in that the reflected waves reflected from the lower plate section 14 and the upper plate section 15 interfere and influence each other. In this way, by forming an asymmetric configuration of the lower plate section 14 and the upper plate section 15, the influence of the reflected wave on the direct wave can be reduced. Since the mesh structure 60 covers the concave portion 59, the air flows through the flow measurement section 61 without flowing into the concave portion 59. Therefore, the flow is not disturbed. Alternatively, the ultrasonic waves may propagate in the flow measurement section 61 including the concave portion 59.

Thus, according to the present invention, since the propagation phase difference between the direct wave and the reflected wave can be set at a desired value by forming the structure, and a stable flow distribution is attained in the range of a measured flow. This reduces the influence of the reflected wave and measure the flow of an object fluid with high precision in a short time.

In Example 9, the concave portion 59 was formed so that the propagation phase difference between the propagation route 62 and the propagation route 63 is 2.2π. The present invention is not limited to the above condition, but an appropriate value can be used. In this example, the mesh structure 60 of a mesh size of No. 100 or the like was formed covering the concave portion 59. Other mesh structures may also be used. Alternatively, no mesh structure is required unless the concave portion 59 influences the flow to such a degree that will cause a problem at measurement. In this example, the concave portion 59 was formed at around the center of the lower plate section 14. Any number of such concave portions may be formed at any positions as long as the reduction of the influence of the reflected wave is achieved. For example, the concave portion may be formed on the upper plate section 15, or a convex portion may be formed in addition to the concave portion 59.

EXAMPLE 10

Hereinbelow, Example 10 according to the present invention will be described with reference to the relevant drawing.

Figure 25:
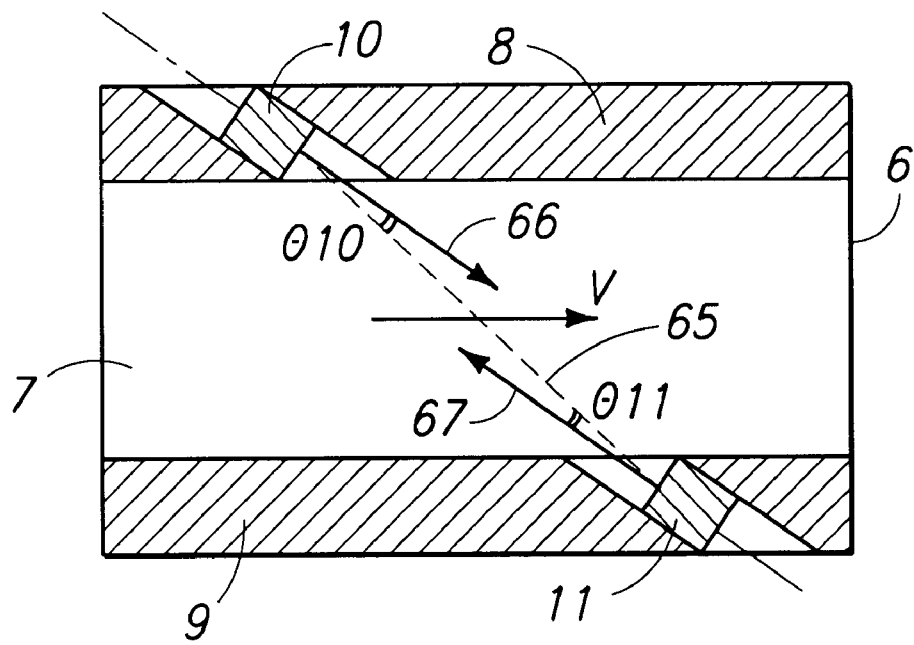
FIG. 25 is a sectional view of an ultrasonic flowmeter of Example 10 according to the present invention, viewed from the top thereof.

FIG. 25 is a sectional view of the flow path 6 of an ultrasonic flowmeter of Example 10, viewed from the top thereof. Referring to FIG. 25, the reference numeral 6 denotes the flow path, and 8 and 9 denote the side-wall sections of the flow path 6, which are substantially the same configuration of FIG. 1. The difference from the configuration of FIG. 1 is that a center direction 66 of the ultrasonic oscillator 10 is shifted by an angle θ10 (about 5 degrees) upstream against a line 65 connecting the centers of the ultrasonic oscillators 10 and 11, and a center direction 67 of the ultrasonic oscillator 11 is shifted by an angle θ11 (about 5 degrees) downstream against the line 65. The method for making the flow path, the method for mounting the ultrasonic oscillators, and the operation principle are substantially the same as those of Example 1, and thus the descriptions thereof are omitted here. The distance between the ultrasonic oscillators 10, 11, the shape of the effective radiation surfaces thereof, the frequency thereof, and the object fluid are the same as those in Example 1.

In general, an ultrasonic oscillator tends to have a strong directivity toward the center direction thereof. Therefore, in an open space, the greatest received voltage is obtained when the ultrasonic oscillators 10, 11 are disposed to face each other to match the directivities thereof. However, when an ultrasonic wave is transmitted and received in a closed space such as the flow path 6, even a reflected wave received has a comparatively strong directivity and thus provides a large received voltage. This results in a large influence on the direct wave. In order to solve this problem, the ultrasonic oscillators 10, 11 are disposed so that the center directions 66, 67 thereof are shifted by the angles θ10, ell against the line 65 connecting the centers thereof. Under this configuration, although the received voltage of the direct wave decreases, the reflected wave has a comparatively weak directivity, and the received voltage of the reflected waves are reduced. Thus, the influence of the reflected wave can be reduced.

An experiment was performed under the configuration where the center direction 66 of the ultrasonic oscillator 10 was shifted by about 5 degrees downstream and the center direction 67 of the ultrasonic oscillator 11 was shifted by about 5 degrees upstream with flowing the air at about 6,000 liters/hour as well as Example 1. As a result, substantially the same results as those shown in FIG. 7, where the propagation phase difference is about 2π, were obtained.

Thus, according to the present invention, by disposing the ultrasonic oscillators so that the center lines thereof are shifted from the line connecting the centers thereof, the influence of the reflected wave on the direct wave can be reduced, and the flow of an object fluid can be measured with high precision in a short time.

In Example 10, the center lines 66, 67 were shifted by five degrees against the line 65 connecting the centers of the ultrasonic oscillators. The present invention is not limited to the above condition, but an appropriate angle can be used. In this example, the center lines of the ultrasonic oscillators 10, 11 were shifted upstream and downstream. Alternatively, they may be shifted toward the lower plate section and the upper plate section. Moreover, a combination of any directions may be used.

EXAMPLE 11

Hereinbelow, Example 11 according to the present invention will be described with reference to the relevant drawing.

Figure 26:
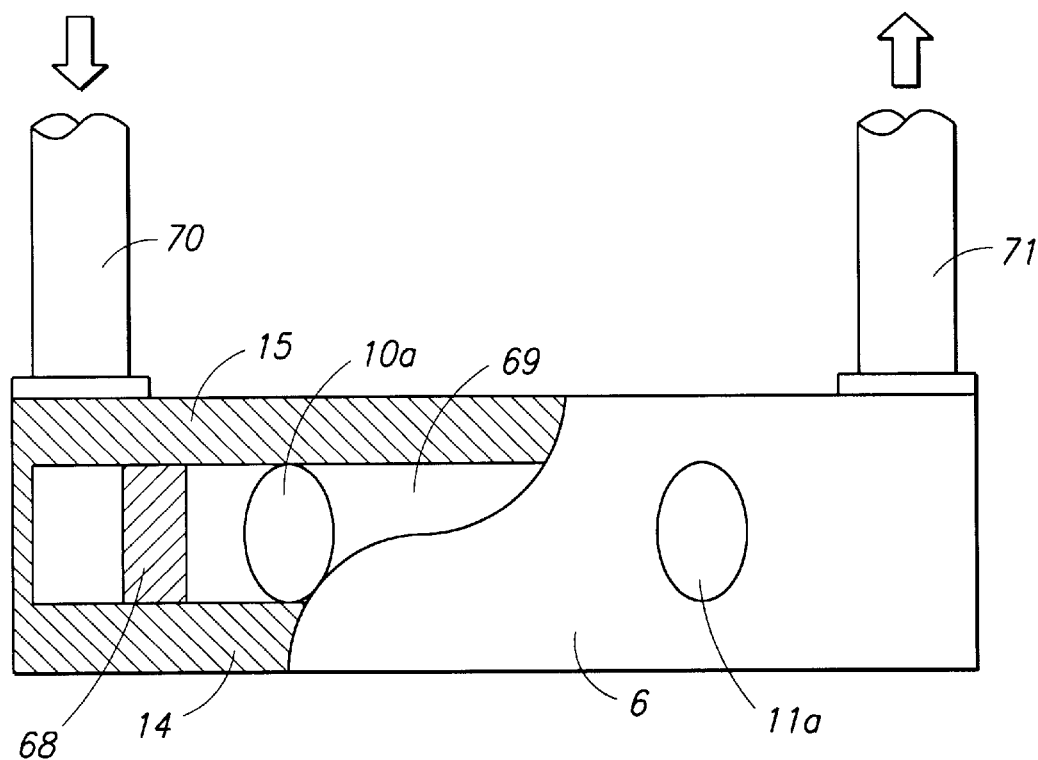
FIG. 26 is a local sectional view illustrating the mounting of an ultrasonic flowmeter of Example 11 according to the present invention to piping.
Figure 27A:
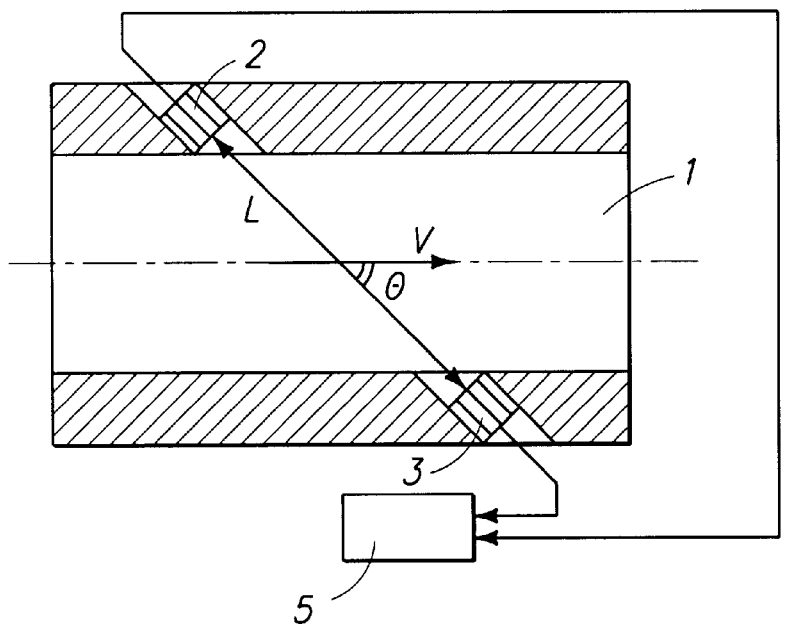
FIGS. 27A and 27B are structural views of a conventional ultrasonic flowmeter.
Figure 27B:
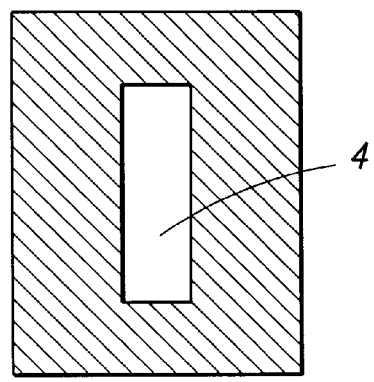

FIG. 26 is a local sectional view illustrating the mounting of an ultrasonic flowmeter of Example 11 according to the present invention in piping. Referring to FIG. 26, the reference numerals 10a, 11a denote mounts, 14, 15 denote the lower plate section and the upper plate section of the flow path 6, 68 denotes a rectifying means, 69 denotes the flow measurement section, and 70, 71 denote pipes. The configuration of the flow measurement section 69 not shown in this figure is substantially the same as that of any of Examples 1 to 10. The difference from any configuration of Examples 1 to 10 is that the rectifying means 68 is provided in the flow measurement section 69. The rectifying means 68 is composed of an aluminum honeycomb structure and secured to the lower plate section 14, the upper plate section 15, and the side-wall section (not shown) with an adhesive so as not to be moved due to the air flow. The method for making the flow path of the ultrasonic flowmeter, the method for mounting the ultrasonic oscillators, and the operation principle are substantially the same as those in Example 1, and thus omitted here.

Hereinbelow, the operation of the rectifying means will be described. In the flow measurement, in general, a straight pipe portion which is sufficiently long compared with the diameter of the pipe (about ten times) is formed on the upstream side of the flow measurement section in order to stabilize the distribution of the flow rate and the direction of the flow. Due to the downsizing of the ultrasonic flowmeter and the restriction of the mounting site thereof, it is difficult to provide a straight pipe portion which is sufficiently long compared with the diameter of the pipe on the upstream side of the flow measurement section 69.

Moreover, in some cases, the pipe 70 is arranged perpendicular to the flow path 6. Under this configuration, the air flows in the flow measurement section 69 while the flow direction thereof is being disturbed, and these result in influencing the measurement precision.

The rectifying means 68 having a honeycomb structure is provided to stabilize the air flow when it flows from the pipe 70 into the flow measurement section 69. The flow direction of the air which has passed through the rectifying means 68 is made uniform to be substantially parallel to the lower plate section 14 and the upper plate section 15.

Thus, according to the present invention, the flow direction can be stabilized by providing the rectifying means 68 on the upstream side of the flow measurement section 69. By combining the rectifying means with the means of reducing the influence of the reflected wave described in any of Examples 1 to 10, the flow of an object fluid can be measured with high precision in a short time.

In Example 11, the honeycomb structure made of aluminum was used as the rectifying means 68. A pipe, a mesh structure, or a plate may also be used as long as the rectifying effect is obtained. Also, a metal such as SUS, a resin, or a composite material may be used as the material. In this example, the pipes 70, 71 were mounted perpendicular to the upper plate section 15. Alternatively, they may be mounted on a section other than the upper plate section 15, or they may be mounted horizontally on the section. In this example, the rectifying means 68 was provided on the upstream side. Alternatively, rectifying means may be provided on both the downstream side and the upstream side.

In Examples 1 to 3 and 7, although the height (H0, H1, H2, H6) is illustrated as being equal to the height of the ultrasonic oscillators 10, 11, the height of the ultrasonic oscillators 10, 11 may be smaller or larger than the height (H0, H1, H2, H6).

In Examples 1 to 5, and 7 to 11, the ultrasonic oscillators 10, 11 were disposed in the side-wall sections 8, 9 with an inclined state against the flow. Alternatively, they may be disposed at positions other than the side-wall sections 8, 9, or they may be disposed parallel to the flow, as long as the measurement of the flow is possible. The section of the flow measurement section was a rectangle. The section may be a circle or an oval if the ultrasonic oscillators 10, 11 are disposed parallel to the flow.

In Examples 1 to 11, the effective radiation surfaces of the ultrasonic oscillators 10, 11 were a square. The present invention is not limited to the above condition, but a circle, an oval, or any polygon may be used. In the above examples, the frequency of the ultrasonic oscillators 10, 11 was 270 kHz. The present invention is not limited to this, but a frequency higher than or lower than 270 kHz can be used. In the above examples, the section of the flow measurement section was a rectangle. The present invention is not limited to this shape, but a shape obtained by deforming a portion of a rectangle, or a polygon other than a rectangle may also be used. In the above examples, the object fluid was the air. Alternatively, a gas other than the air, such as an LP gas and a town gas, or a liquid such as water may be used. In the above examples, an ABS resin was used as the material of the flow path 6. Alternatively, any material can be used as long as it is free from a chemical change against the object fluid. If the object fluid is an LP gas, a city gas, or the like, a metal such as SUS and die-cast aluminum may be used. In general, the sectional area of the flow measurement section was substantially the same as the inner diameter of a pipe for supplying an object fluid in order to reduce the pressure loss. Alternatively, the sectional area may be larger or smaller as required. The ultrasonic flowmeter according to the present invention may be used as an ultrasonic gas meter such as a household gas meter and as a current meter for measuring the flow rate of an object fluid. It is needless to say that the present invention may be configured in combination of any of the above examples.

Industrial Applicability

As described above, the first ultrasonic flowmeter according to the present invention includes: a pair of ultrasonic oscillators; a measurement section for measuring a time in which an ultrasonic wave propagates between the pair of ultrasonic oscillators; and a calculation section for calculating the flow of the fluid flowing in a flow measurement section based on an output from the measurement section, wherein the flow measurement section and the pair of ultrasonic oscillators are configured so that an influence of a reflected wave reflected from a wall of the flow measurement section on a measurement result is reduced. Accordingly, the influence of the reflected wave in the flow measurement section can be reduced, to obtain a high-precision ultrasonic flowmeter.

The second ultrasonic flowmeter, for measuring a flow of a fluid by use of ultrasonic wave, includes: a pair of ultrasonic oscillators; a measurement section for measuring a time in which an ultrasonic wave propagates between the pair of ultrasonic oscillators; and a calculation section for calculating the flow of the fluid flowing in a flow measurement section based on an output from the measurement section, wherein, in a configuration where a phase difference between a direct wave which propagates in the fluid flowing in the flow measurement section without being reflected from a wall of the flow measurement section and a reflected wave which is reflected from a wall of the flow measurement section influences a measurement result, the flow measurement section and the pair of ultrasonic oscillators are configured so that an influence of the phase difference between the direct wave and the reflected wave on the measurement result can be reduced. Accordingly, the influence of the reflected wave in the flow measurement section can be reduced, to obtain a high-precision ultrasonic flowmeter.

The third ultrasonic flowmeter, for measuring a flow of a fluid by use of ultrasonic wave, includes: a pair of ultrasonic oscillators; a measurement section for measuring a time in which an ultrasonic wave propagates between the pair of ultrasonic oscillators; and a calculation section for calculating the flow of the fluid flowing in a flow measurement section based on an output from the measurement section, wherein, in a configuration where a phase difference between a direct wave which propagates in the fluid flowing in the flow measurement section without being reflected from a wall of the flow measurement section and a reflected wave which is reflected from a wall of the flow measurement section influences a measurement result, parameters relating to a frequency of the pair of ultrasonic oscillators, a distance between the pair of ultrasonic oscillators, and a sectional shape of the flow measurement section are combined so that an influence of the phase difference between the direct wave and the reflected wave on the measurement result can be reduced. Accordingly, the influence of the reflected wave in the flow measurement section can be reduced with a simple structure, to obtain a high-precision ultrasonic flowmeter.

In the fourth ultrasonic flowmeter, based on the third ultrasonic flowmeter, the direct wave is a wave which propagates along a straight line connecting centers of the pair of ultrasonic oscillators, the reflected wave is a wave which propagates along two equal sides of an isosceles triangle formed by connecting the centers of the pair of ultrasonic oscillators and a point on a wall of the flow measurement section, and a propagation phase difference caused by a difference between a propagation distance of the direct wave and a propagation distance of the reflected wave is $3\pi/2$ or more. Accordingly, the influence of the reflected wave in the flow measurement section can be reduced with a simple structure, to obtain a high-precision ultrasonic flowmeter.

In the fifth ultrasonic flowmeter, based on the third ultrasonic flowmeter, the direct wave is a wave which propagates along a straight line connecting centers of the pair of ultrasonic oscillators, the reflected wave is a wave which is reflected only once from a wall of the flow measurement section, and one side or a diameter of effective radiation surfaces of the pair of ultrasonic oscillators is shorter than a height of the flow measurement section so that a shortest propagation time of the reflected wave is longer than a propagation time of the direct wave. Accordingly, the influence of the reflected wave in the flow measurement section can be reduced with a simple structure, to obtain a high-precision ultrasonic flowmeter.

In the sixth ultrasonic flowmeter, based on the fourth or fifth ultrasonic flowmeter, a frequency of the pair of ultrasonic oscillators is set at a predetermined value or more. Accordingly, the influence of the reflected wave in the flow measurement section can be reduced and the time resolution can be improved, to obtain a further high-precision ultrasonic flowmeter.

In the seventh ultrasonic flowmeter, based on the third ultrasonic flowmeter, the direct wave is a wave which propagates along a straight line connecting centers of the pair of ultrasonic oscillators, the reflected wave is a wave which propagates along two equal sides of an isosceles triangle formed by connecting the centers of the pair of ultrasonic oscillators and a point on a wall of the flow measurement section, and a propagation phase difference caused by a difference between a propagation distance of the direct wave and a propagation distance of the reflected wave is $0.2\pi$ or less. Accordingly, the influence of the reflected wave in the flow measurement section can be reduced with a simple structure, to obtain a high-precision ultrasonic flowmeter.

In the eighth ultrasonic flowmeter, based on the seventh ultrasonic flowmeter, the ultrasonic flowmeter further includes at least one or more partition plate for dividing the flow measurement section into a plurality of portions. Accordingly, the influence of the reflected wave in the flow measurement section can be reduced, to obtain a high-precision ultrasonic flowmeter.

In the ninth ultrasonic flowmeter, based on the eighth ultrasonic flowmeter, the frequency of the pair of ultrasonic oscillators is set at a predetermined value or less. Accordingly, the influence of the reflected wave in the flow measurement section can be reduced, to obtain a high-precision ultrasonic flowmeter.

In the tenth ultrasonic flowmeter, based on any of the first to fifth or seventh ultrasonic flowmeter, the sectional shape of the flow measurement section is a rectangle, and a parameter relating to the cross section shape of the flow measurement section is a height of the rectangle. Accordingly, the influence of the reflected wave in the flow measurement section can be reduced with a simple structure, to obtain a high-precision ultrasonic flowmeter.

In the eleventh ultrasonic flowmeter, based on any of the first to fifth or seventh ultrasonic flowmeter, the cross section shape of the flow measurement section is a circle, and a parameter relating to the sectional shape of the flow measurement section is a diameter of the circle. Accordingly, the influence of the reflected wave in the flow measurement section can be reduced with a simple structure, to obtain a high-precision ultrasonic flowmeter.

In the twelfth ultrasonic flowmeter, based on the first to fifth or seventh ultrasonic flowmeter, the pair of ultrasonic oscillators are disposed so that a line connecting centers of the pair of ultrasonic oscillators is shifted with respect to a center line of the cross section of the flow measurement section in a predetermined direction. Accordingly, the influence of the reflected wave in the flow measurement section can be reduced, to obtain a high-precision ultrasonic flowmeter.

In the thirteenth ultrasonic flowmeter, based on the twelfth ultrasonic flowmeter, the line connecting the centers of the pair of ultrasonic oscillators and the center line of the cross section of the flow measurement section in a predetermined direction are parallel with each other. Accordingly, the influence of the reflected wave in the flow measurement section can be reduced, to obtain a high-precision ultrasonic flowmeter.

In the fourteenth ultrasonic flowmeter, based on the twelfth ultrasonic flowmeter, the line connecting the centers of the pair of ultrasonic oscillators and the center line of the cross section of the flow measurement section in a predetermined direction cross at a predetermined angle. Accordingly, the influence of the reflected wave in the flow measurement section can be reduced, to obtain a high-precision ultrasonic flowmeter.

In the fifteenth ultrasonic flowmeter, based on the first or second ultrasonic flowmeter, the ultrasonic flowmeter further includes a structure for blocking a generation of a reflected wave which is reflected only once from a wall of the flow measurement section. Accordingly, the influence of the reflected wave in the flow measurement section can be reduced, to obtain a high-precision ultrasonic flowmeter.

In the sixteenth ultrasonic flowmeter, based on the fifteenth ultrasonic flowmeter, the line connecting the centers of the pair of ultrasonic oscillators and the center line of the cross section of the flow measurement section in a predetermined direction cross at a predetermined angle. Accordingly, the influence of the reflected wave in the flow measurement section can be reduced, to obtain a high-precision ultrasonic flowmeter.

In the seventeenth ultrasonic flowmeter, based on the first or second ultrasonic flowmeter, the ultrasonic flowmeter further includes at least one structure disposed in the flow measurement section. Accordingly, the influence of the reflected wave in the flow measurement section can be reduced, to obtain a high-precision ultrasonic flowmeter.

In the eighteenth ultrasonic flowmeter, based on the seventeenth ultrasonic flowmeter, the at least one structure is disposed in the vicinity of the pair of ultrasonic oscillators. Accordingly, the influence of the reflected wave in the flow measurement section can be reduced, to obtain a high-precision ultrasonic flowmeter, In the nineteenth ultrasonic flowmeter, based on the seventeenth ultrasonic flowmeter, the at least one or more structure is disposed on a wall of the flow measurement section. Accordingly, the influence of the reflected wave in the flow measurement section can be reduced, to obtain a high-precision ultrasonic flowmeter.

In the twentieth ultrasonic flowmeter, based on the first or second ultrasonic flowmeter, at least one concave or convex portion is provided on a wall of the flow measurement section. Accordingly, the influence of the reflected wave in the flow measurement section can be reduced, to obtain a high-precision ultrasonic flowmeter.

In the twenty-first ultrasonic flowmeter, based on the twentieth ultrasonic flowmeter, the ultrasonic flowmeter further includes a mesh structure covering the concave portion. Accordingly, the influence of the reflected wave in the flow measurement section can be reduced, to obtain a high-precision ultrasonic flowmeter.

In the twenty-second ultrasonic flowmeter, based on any of the first to fifth or seventh ultrasonic flowmeter, the pair of ultrasonic oscillators are disposed so that a line connecting centers of the pair of ultrasonic oscillators and a direction representing a directivity of at least one of the pair of ultrasonic oscillators cross at a predetermined angle. Accordingly, the influence of the reflected wave in the flow measurement section can be reduced, to obtain a high-precision ultrasonic flowmeter.

In the twenty-third ultrasonic flowmeter, based on any of the first to twenty-second ultrasonic flowmeters, the ultrasonic flowmeter further includes rectifying means for rectifying the direction of the flow at least on an upstream side of the flow measurement section. Accordingly, the direction of the flow in the flow measurement section can be made uniform, to obtain further high-precision ultrasonic flowmeter.

What is claimed is:
1. An ultrasonic flowmeter comprising:
   a flow path including
      a flow measurement section in which a fluid flows, said flow measurement section being defined by at least one wall section, a cross-section of said flow measurement section having a shape; and
      a pair of ultrasonic oscillators both configured to transmit and receive from each other an ultrasonic wave having a propagation frequency, said ultrasonic wave comprising a direct wave and a reflected wave which is reflected from one of said at least one wall section resulting in a phase difference corresponding to the difference between a propagation distance of said direct wave and a propagation distance of said reflected wave, said pair of ultrasonic oscillators being separated by a distance, said pair of ultrasonic oscillators connected to at least one of said at least one wall section;
   a measurement section coupled to said pair of ultrasonic oscillators and configured to measure a propagation time of said ultrasonic wave which propagates between said pair of ultrasonic oscillators; and
   a calculation section coupled to said measurement section and configured to calculate a flow of said fluid in said flow measurement section in response to a measurement result output from said measurement section;
   wherein said flow path is configured to reduce an influence of the phase difference between said direct wave and said reflected wave upon said measurement result by changing at least one of said propagation frequency of said ultrasonic wave, said distance separating said pair of ultrasonic oscillators and said shape of said cross-section of said flow measurement section.

2. An ultrasonic flowmeter according to claim 1, wherein said direct wave propagates along a straight line connecting respective centers of said pair of ultrasonic oscillators, said reflected wave propagates along two equal sides of an isosceles triangle formed by connecting respective points of the respective centers of said pair of ultrasonic oscillators and a further point, said further point is on one of said at least one wall section, and said phase difference comprises at least $3\pi/2$.

3. An ultrasonic flowmeter according to claim 2, wherein said propagation frequency of said ultrasonic wave is set at a predetermined value.

4. An ultrasonic flowmeter according to claim 1, wherein said direct wave propagates along a straight line connecting respective centers of said pair of ultrasonic oscillators, said reflected wave is reflected only once from one of said at least one wall section, and a propagation time of said reflected wave is longer than a propagation time of said direct wave.

5. An ultrasonic flowmeter according to claim 1, wherein said direct wave propagates along a straight line connecting respective centers of said pair of ultrasonic oscillators, said reflected wave propagates along two equal sides of an isosceles triangle formed by connecting respective points of the respective centers of said pair of ultrasonic oscillators and a further point, said further point is on one of said at least one wall section, and said phase difference comprises up to $0.2\pi$.

6. An ultrasonic flowmeter according to claim 5, further comprising at least one partition plate for dividing said flow measurement section into a plurality of portions.

7. An ultrasonic flowmeter according to claim 6, wherein said propagation frequency of said ultrasonic wave is set at a predetermined value.

8. An ultrasonic flowmeter according to claim 1, wherein said shape of said cross-section of said flow measurement section is a rectangle having a height that is suitably varied to reduce said influence of said phase difference upon said measurement result.

9. An ultrasonic flowmeter according to claim 1, further comprising a line connecting respective centers of said pair of ultrasonic oscillators is shifted against a center line of said cross-section of said flow measurement section in a predetermined direction.

10. An ultrasonic flowmeter according to claim 9, wherein said line connecting the respective centers of said center line of said cross-section of said flow measurement section are parallel with each other.

11. An ultrasonic flowmeter according to claim 9, wherein said line connecting the respective centers of said pair of ultrasonic oscillators and said center line of said cross-section of said flow measurement section cross at a predetermined angle.

12. An ultrasonic flowmeter according to claim 1, further comprising a structure disposed in said flow measurement section for blocking a generation of a reflected wave which is reflected only once from one of said at least one wall section.

13. An ultrasonic flowmeter according to claim 12, further comprising a line connecting the respective centers of said pair of ultrasonic oscillators and a center line of said cross-section of said flow measurement section cross at a predetermined angle.

14. An ultrasonic flowmeter according to claim 1, further comprising at least one structure disposed in said flow measurement section.

15. An ultrasonic flowmeter according to claim 14, wherein said structure is disposed at an interface of said flow measurement section and said at least one wall section near at least one of said pair of ultrasonic oscillators.

16. An ultrasonic flowmeter according to claim 1, further comprising at least one of a concave portion and a convex portion is disposed in said flow measurement section.

17. An ultrasonic flowmeter according to claim 1, further comprising at least one concave portion is disposed in said flow measurement section, and a mesh structure covers said concave portion.

18. An ultrasonic flowmeter according to claim 1, further comprising a line connecting respective centers of said pair of ultrasonic oscillators and a direction representing a directivity of at least one of said pair of ultrasonic oscillators cross at a predetermined angle.

19. An ultrasonic flowmeter according to claim 1, further comprising a rectifying means for rectifying a direction of said flow of said fluid on at least an upstream side of said flow measurement section.

* * * * *